Figure 1:
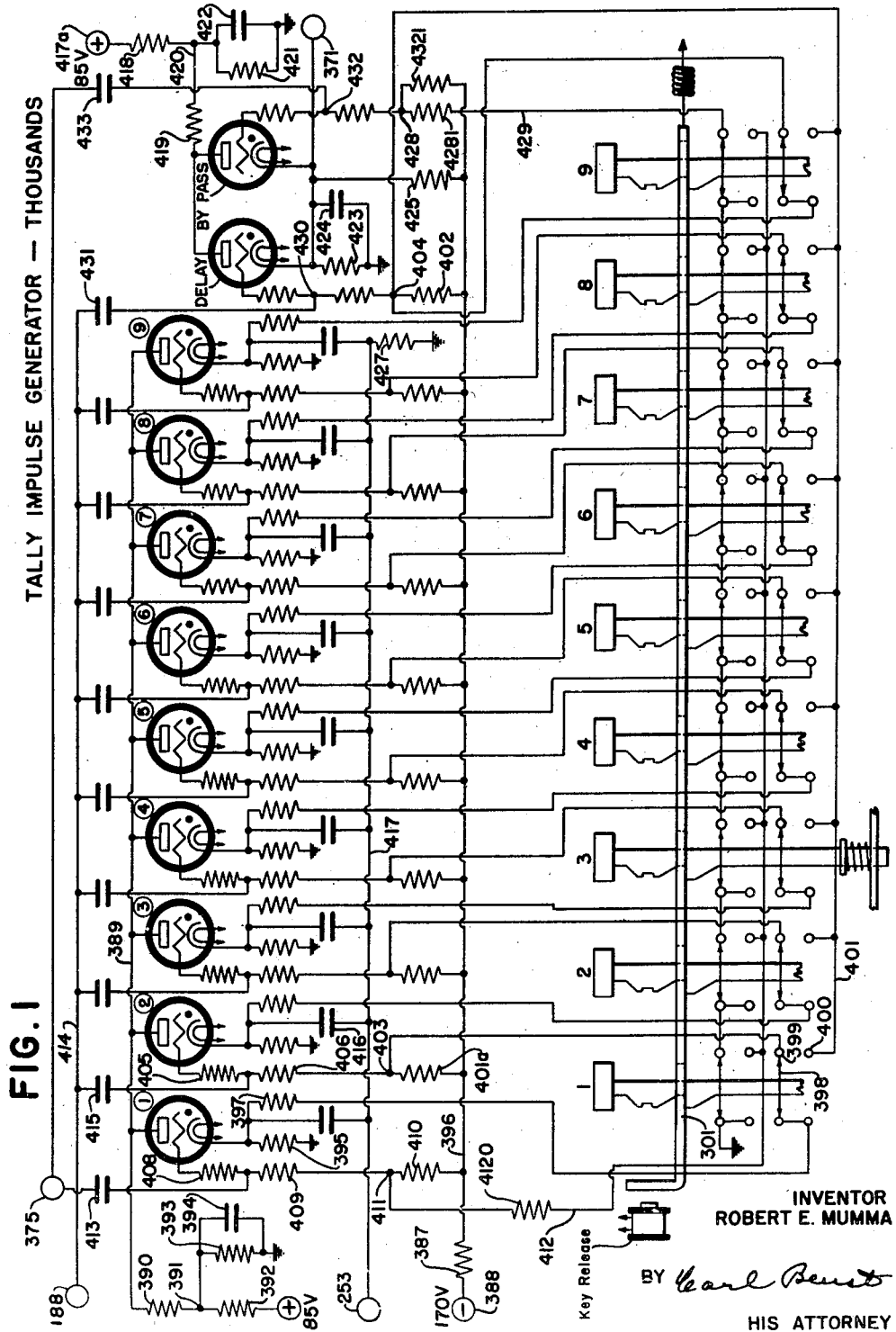

INVENTOR
ROBERT E. MUMMA
BY Carl Beust
HIS ATTORNEY

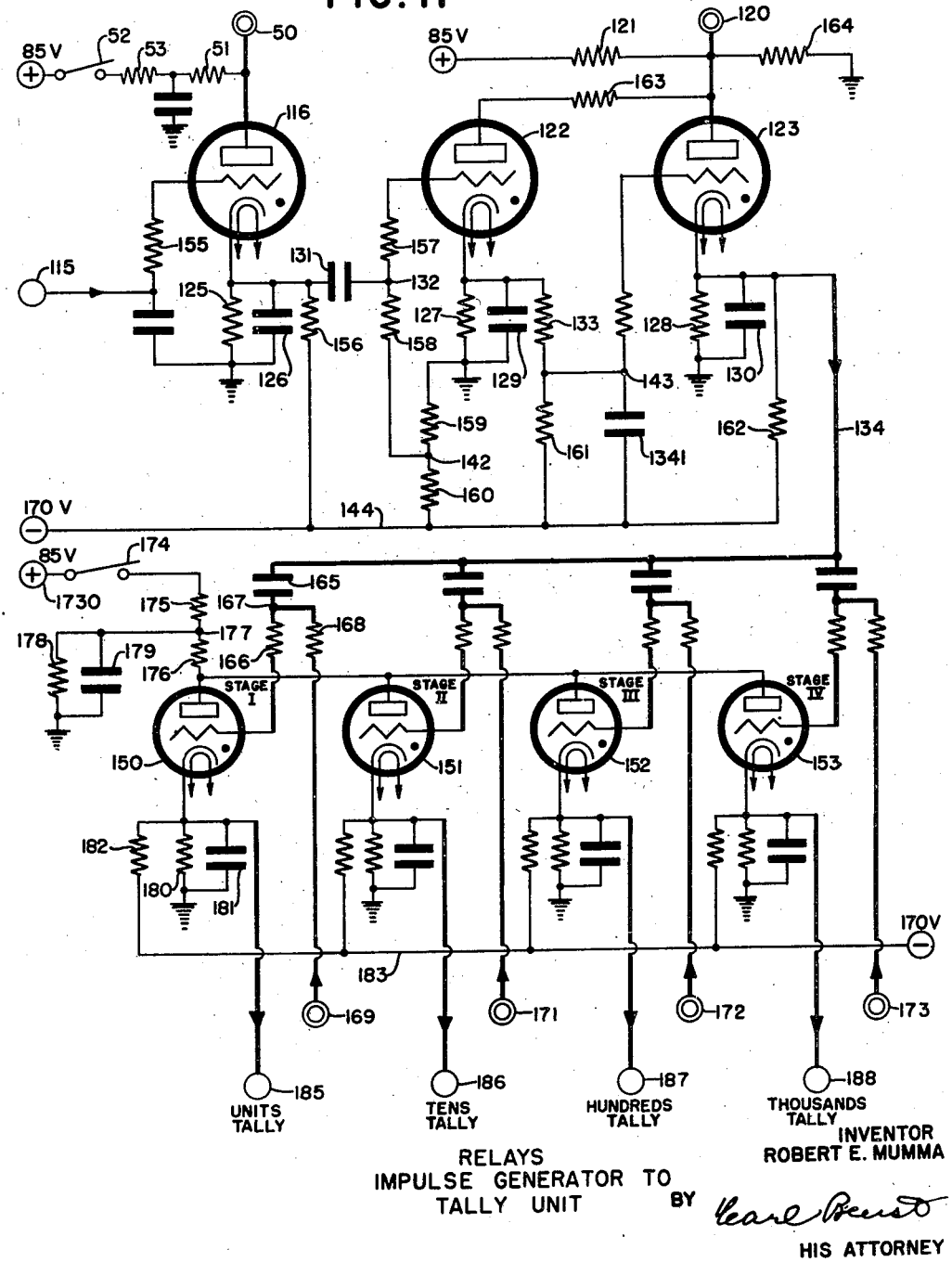

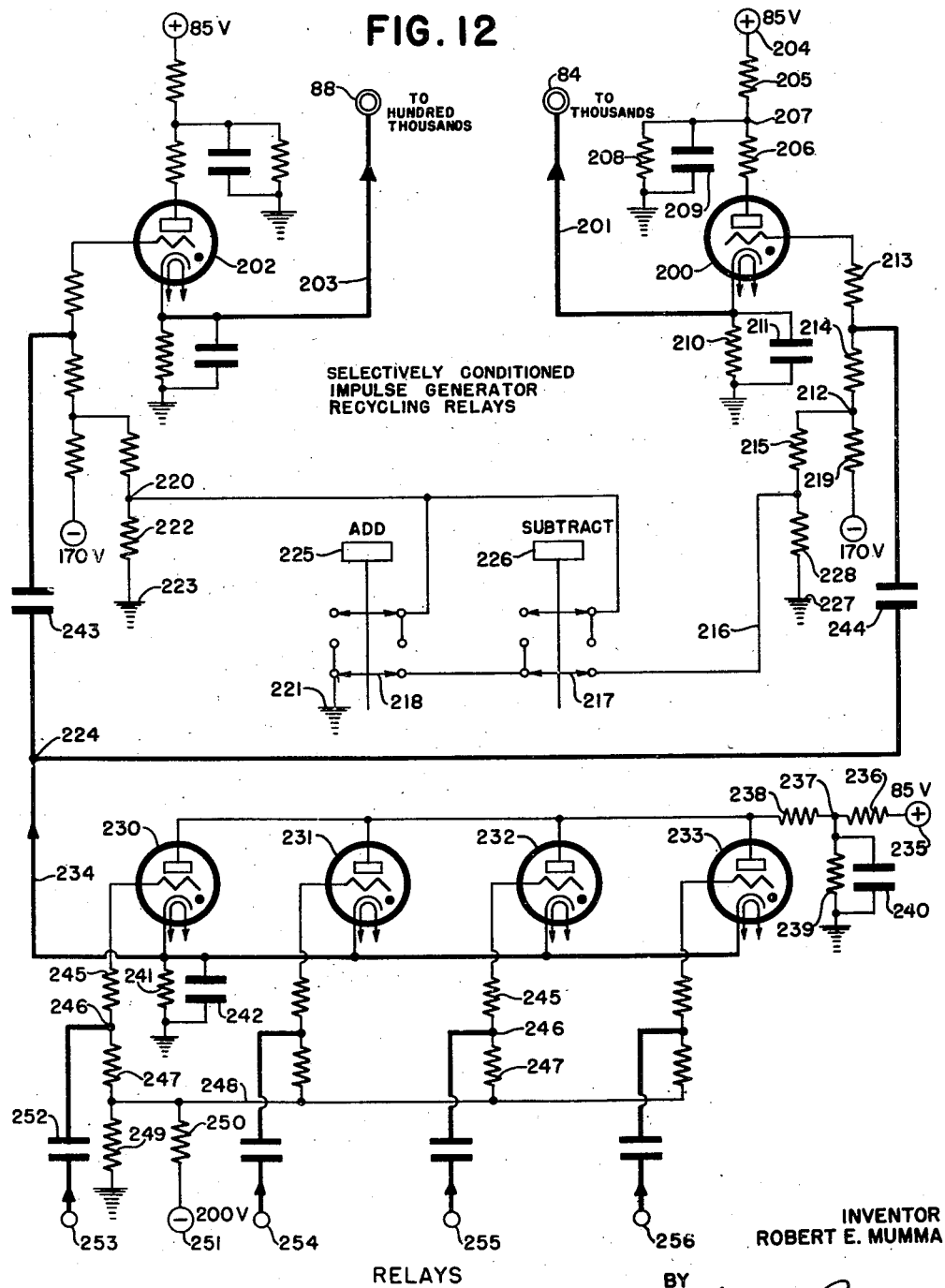

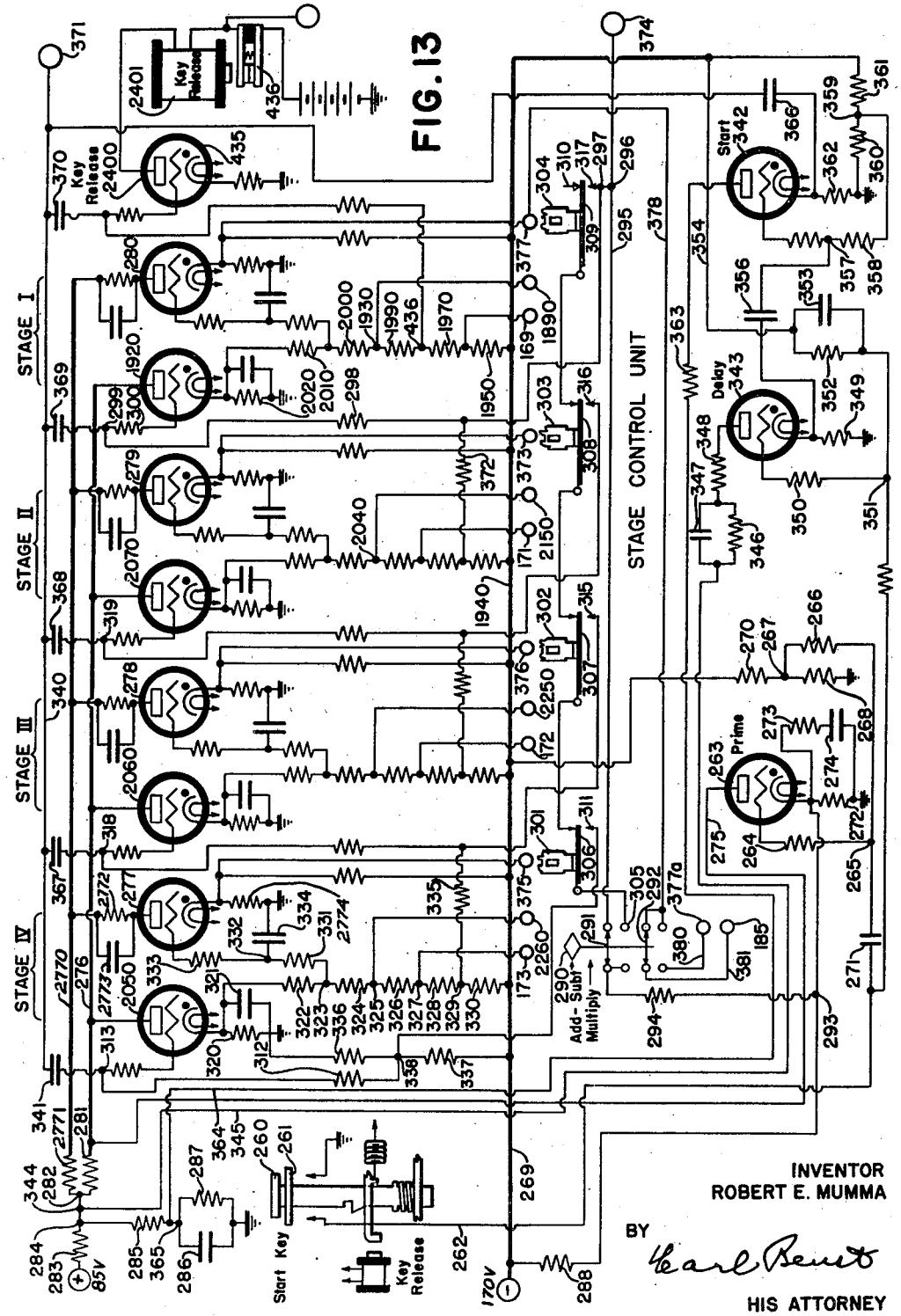

Patented Apr. 4, 1950

2,503,127

UNITED STATES PATENT OFFICE 2,503,127

ELECTRIC IMPULSE GENERATOR FOR CALCULATING MACHINES

Robert E. Mumma, Dayton, Ohio, assignor to The National Cash Register Company, Dayton, Ohio, a corporation of Maryland Original application December 27, 1943, Serial No. 515,718, now Patent No. 2,442,428, dated June 1, 1948. Divided and this application August 6, 1947, Serial No. 766,778

48 Claims. (Cl. 177—380)

This invention relates to an electric impulse producer for a calculating machine, and more particularly pertains to one having an impulse generator including a plurality of denominational output conductors, each of which receives in a cycle of operation an individually selected number of impulses, said impulse generator having a tally unit control operable to automatically recycle the impulse generator a selected number of times.

This is a division of my co-pending application for United States Letters Patent, Serial No. 515,718, for a Calculating device, which was filed December 27, 1943, and which issued on June 1, 1948, as Patent No. 2,442,428, and the impulse generator disclosed herein is particularly adapted to produce on each output conductor, on each of a selected plurality of cycles constituting a calculating operation as controlled by the tally unit, a selected number of impulses, each representing a unit of value of the denomination, such impulses being impressed on the denominational conductors in succession in a cycle.

The impulse generator includes a plurality of denominational banks of digit-representing electron tubes, of the gaseous discharge type, each bank of tubes being coupled in a key-controlled circuit wherein selected numbers of tubes in each bank are fired and extinguished, in succession, in each cycle, and the banks themselves being coupled in an operative circuit wherein they are caused to operate in succession each cycle.

The number of cycles of operation of the impulse generator is controlled by the tally unit including a plurality of denominational banks of digit-representing electron tubes, of the gaseous discharge type, the tubes in a bank being coupled in a key-controlled circuit in which they are fired and extinguished in succession in response to commonly received electric impulses. An electric impulse is issued to the tally unit to commence its operation, and another is issued to it after each cycle of operation of the impulse generator. The banks of the tally unit are coupled together for successive operation. Each time a tube is fired in the tally unit, it produces an electric impulse to start an operative cycle of the impulse generator.

The keys in each bank, whether of the impulse generator unit or the tally unit, control the number of tubes to operate in the bank, and by their selective use the factors of a calculation are set up. For instance, in a multiplying operation the keys of the impulse generator are used to set up the multiplicand factor and the keys of the tally unit are used to set up the multiplier factor.

On operation of the impulse producer, the pattern of impulses representing the multiplicand is issued on the output conductors of the impulse generator as many times as is determined by the selected and operated keys of the tally unit.

By use of electron tubes, the successive operation of which may be made extremely fast, the impulse producer creates the selective pattern of impulses in a small fraction of the time it would take a mechanical device to accomplish the same result.

Although the produced impulses are adapted to operate any accumulator responding to denominationally produced impulses of unit value, the device is especially adapted to operate an electronic accumulator through the medium of an electronic switching and routing device particularly set out and described in my aforesaid Patent No. 2,442,428.

Therefore, it is the principal object of the invention to provide an electric impulse producer which produces a denominational pattern of electric impulses, denomination by denomination, in cycles, repeated a selected number of times.

Another object of the invention is to provide such an electric impulse producer utilizing impulse-producing electron tubes as digit-representing elements.

Another object of the invention is to provide such an electric impulse producer which has a key-controlled impulse generator unit and a key-controlled tally unit for recycling the impulse generator a selected number of times, such unit providing, by operation of the keys, means to set calculating factors into the machine.

With these and incidental objects in view, the invention includes certain novel features of construction, circuits, and combination of parts, the essential elements of which are set forth in appended claims and a preferred form or embodiment of which is hereinafter described with reference to the drawings which accompany and form a part of this specification.

Of the drawings:

Figs. 1, 2, 3, and 4 show, respectively, the thousands, hundreds, tens, and units denominational orders of the tally unit.

Figs. 5, 6, 7, 8, 9, and 10 show, respectively, the units, tens, hundreds, thousands, tens of thousands, and hundreds of thousands denominational orders of the impulse generator unit.

Fig. 11 includes the circuits coupling the impulse generator unit and the tally unit to cause the tally unit to function a step at the conclusion of a cycle of the impulse generator unit.

Fig. 12 includes the circuits for relaying the tally unit recycling impulses to initiate cycles of operation of the impulse generator unit.

Fig. 13 shows the circuit for controlling the stages of operation of the tally unit.

The gaseous triode electron tubes used in the disclosed embodiment of the invention are of the thermionic cathode type having an anode, a cathode, and a control grid and having an internal potential drop during conduction of about 15 volts, with the electrode elements so related that a tube will fire when the grid is more positive than about 12 to 20 volts negative with respect to the cathode, depending on the anode-cathode potential. Circuits for heating the cathodes are indicated only conventionally. These tube characteristics are true of all the gaseous tubes shown in the drawings.

Values of potential, resistance, and capacitance, as given, are relative and are given as one set of values which result in proper operation with the specified tubes, but are not to be deemed the only circuit values that can be used, as the principles involved in the invention permit of different levels for these relative values and of different relative values when electron tubes of other characteristics are used. Potentials given are with respect to ground potential.

The impulse generator

Figs. 5, 6, 7, 8, 9, and 10 show, respectively, the units, tens, hundreds, thousands, tens of thousands, and hundreds of thousands denominational banks of the impulse generator. Each bank includes nine gaseous triodes (numbered "1," "2," "3," "4," "5," "6," "7," "8," and "9," respectively), representing the digits of an order of a decimal denomination, a gaseous triode, designated D, which functions as a by-pass device, and a gaseous triode, designated T, which functions to initiate the operation of another lower denominational bank of impulse generator tubes, or, in the case of the units bank, to initiate a step of operation of the tally impulse generator unit (see Figs. 1, 2, 3, and 4). The denominational banks of the impulse generator are linked together by the T tubes, or transfer tubes, and the banks are thus caused to operate serially from a higher beginning bank towards the units bank.

Figure 8:
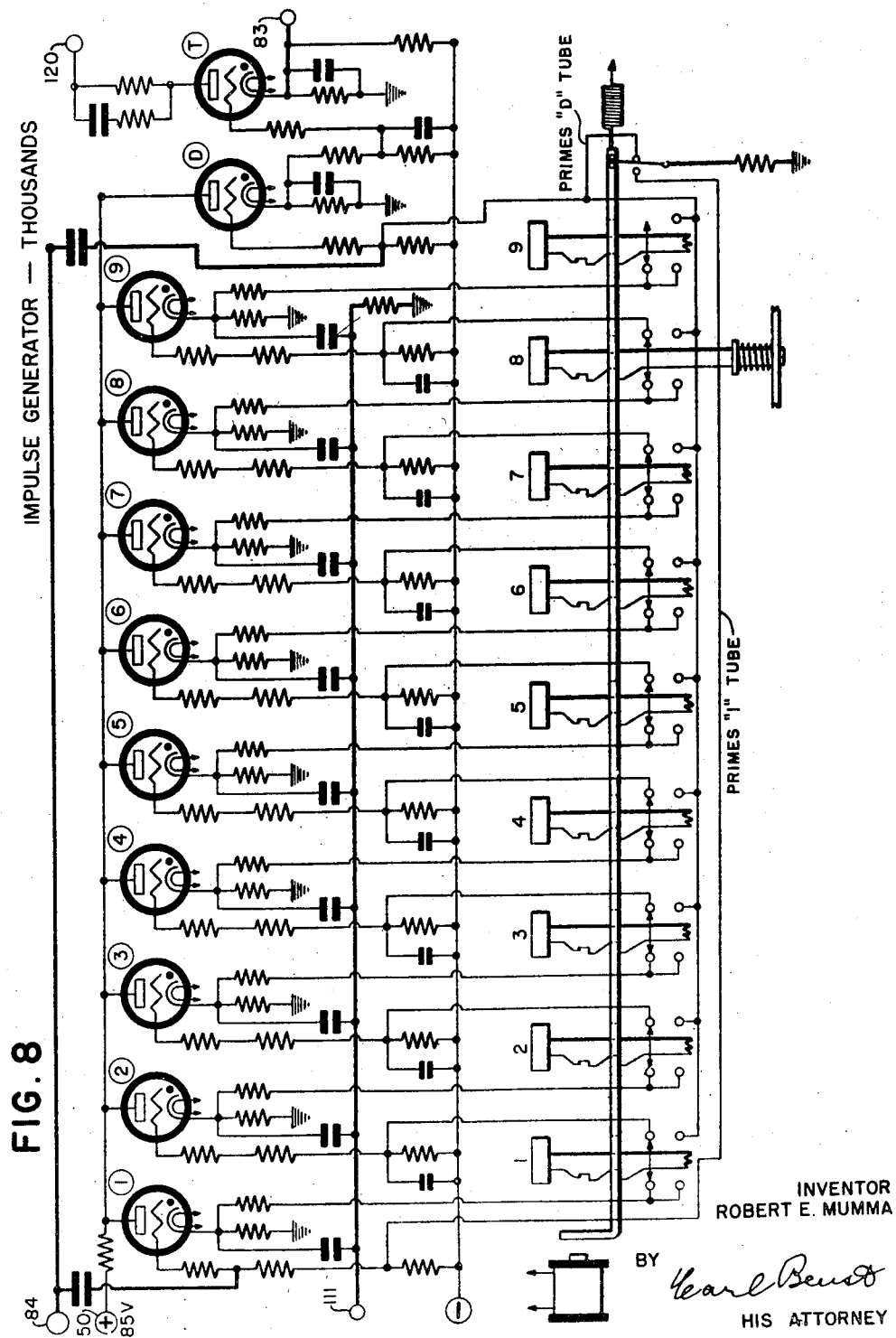

The number of impulses to be produced by each denomination of the impulse generator and sent to the accumulator is determined by operation of a selected digit key in selected banks of the impulse generator, the operation of a key acting to operate an associated switch to prepare certain digit tubes in each of such selected banks to operate. The digit keys are numbered in the drawings according to the digit tube with which each is associated. The selected digit tubes in a bank are fired and rendered conducting one at a time in sequence automatically after the initiating tube, which is the "1" tube, fires, and the operation of the bank is completed, after the selected tubes have fired, by the firinng of the D tube and the T tube. As each digit tube is fired, an impulse is generated on an associated denominational output conductor. In case no key in a bank is operated, the D tube of the bank will fire to by-pass that bank by firing, in turn, the associated T tube. The T tube of each bank, except the units bank, by firing and becoming conducting, causes the initiating "1" tube or the D tube of the next lower denominational bank to fire. In multiplication, the highest two orders of the impulse generator—the hundred thousands order (Fig. 10) and the ten thousands order (Fig. 9)—are not used and are by-passed by connections to be described, and the initiation of an operation constituting a cycle of a multiplying operation commences with the thousands bank (Fig. 8). The only reason for the elimination of the highest two orders of the impulse generator in multiplication is that the capacity of an accumulator of the normal commercial eight denominations might be approached in a single multiplying operation or in several multiplying operations, if the factors were large. It is to be noted, however, that, by providing such an accumulator with more capacity, such elimination of the higher denominations of the impulse generator need not be resorted to. In single-cycle operations, such as adding or substracting, all six banks of the impulse generator are used.

Each digit tube of a bank of the impulse generator is coupled, as has been said, to a common output conductor representing that bank, and, as each digit tube associated with such an output conductor is fired, it produces a positive electric potential impulse on said output conductor which may be utilized to actuate an accumulator. The impulses on a particular output conductor thus have denominational significance and, in one type of calculation, are routed in a given cycle of operation of the impulse generator to the proper denomination of an accumulator, automatically, by an electronic denominational impulse distributor according to the stage of the calculation, as described in the before-mentioned Patent No. 2,442,428.

The key switch associated with each digit key controls the operation of the digit tubes of the associated bank to produce the selected number of impulses, and the associated keys numbered "1," "2," "3," "4," "5," "6," "7," "8," and "9" each control in a cycle the production of an equivalent number of impulses.

The units bank (Fig. 5) of the impulse generator group of banks will be used as an example of a typical bank of the group, as in essence all of the banks of the impulse generator are the same, with the exception that the D and T tubes of the units bank have the same anode supply source as the associated digit tubes, whereas, in the higher banks, a separate anode potential supply source is provided for the T tubes.

Figure 5:
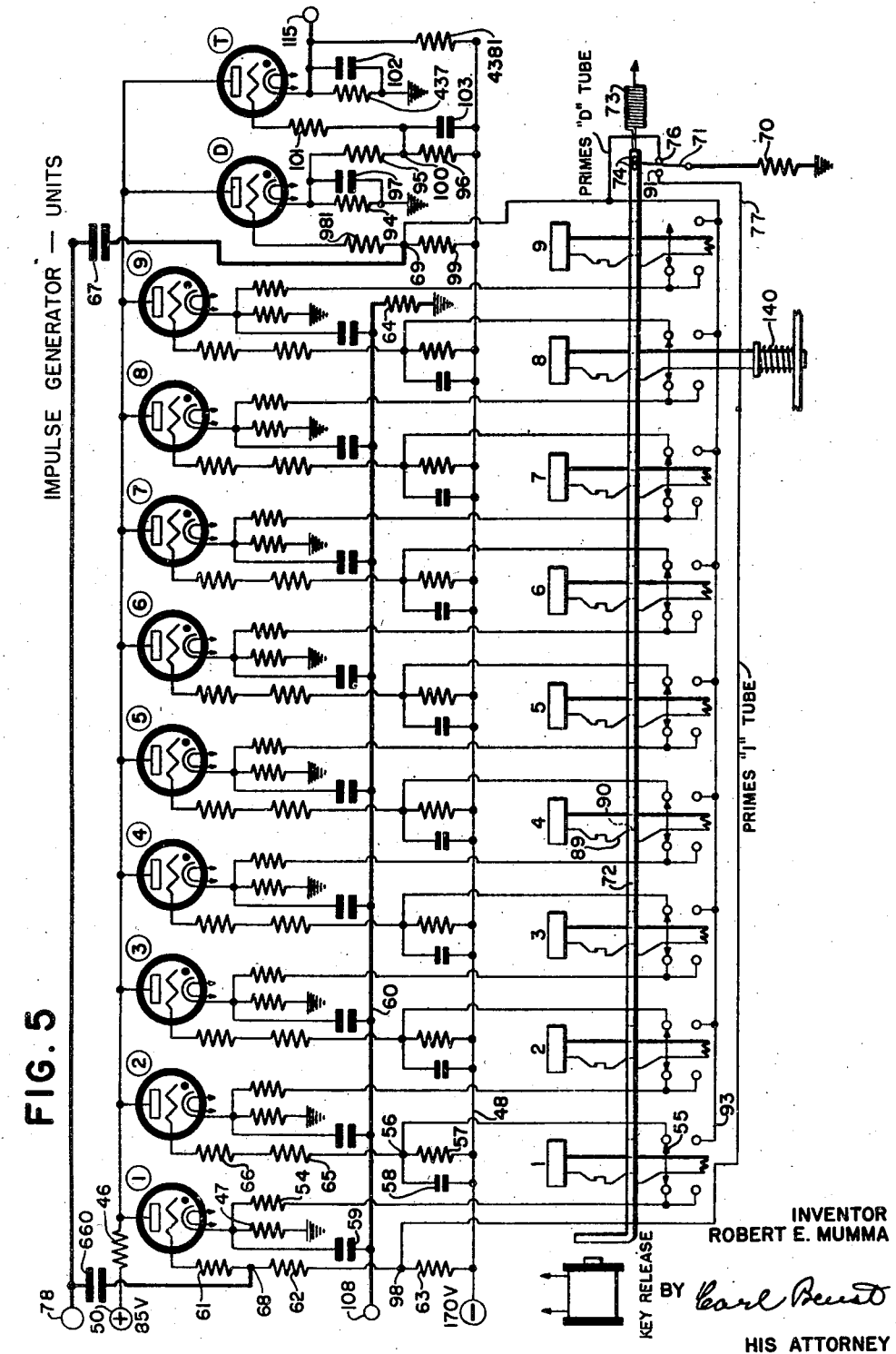

Referring to the units bank (Fig. 5), the anodes of all the tubes, including the digit tubes and the D and T tube, are connected to a source of potential of 85 volts positive through terminal 50 and resistor 46 of 1,000 ohms. Terminal 50 is common to all the banks of the impulse generator (see also Figs. 5, 7, 8, 9, and 10) and obtains its potential through a resistor 51 (Fig. 11) of 4,000 ohms and a resistor 53 of 25 ohms on the closing of switch 52. The cathodes of each of the digit tubes of Fig. 5 are connected on one side to ground through a resistor such as resistor 47 of 25,000 ohms and are normally connected on the other side to a negative 170-volt conductor 48 through a resistor like resistor 54 of 60,000 ohms, a switch like switch 55, a point like point 56, and a resistor like resistor 57 of 100,000 ohms. Points like point 56 are coupled also to the negative supply conductor 48 through a capacitor like capacitor 58 of .002 microfarad. The cathode of each digit tube is connected, through a capacitor like capacitor 59 of .005 microfarad, to an output conductor 60, which is connected to terminal 108 and grounded through resistor 64 of 100,000 ohms. It will be apparent that, when any one of these digit tubes fires and is rendered conducting, due to the resistance in the cathode supply, there will be a positive rise in potential of the cathode, which will be impressed through the capacitor to the output conductor, and consequently said output conductor 60 and terminal 108 receives a positive potential impulse signal for each digit tube of the bank, as it fires and becomes conducting. Terminals 109 (Fig. 6), 110 (Fig. 7), 111 (Fig. 8), 112 (Fig. 9), and 113 (Fig. 10) are the output terminals for the tens, hundreds, thousands, ten thousands, and hundred thousands banks of the impulse generator, respectively.

The grid of each digit tube (Fig. 5) is connected to the negative 170-volt conductor 48 through a resistor like resistor 61 of 50,000 ohms, a resistor 62 of 500,000 ohms, and a resistor 63 of 100,000 ohms. Thus each digit tube grid is normally heavily biased against conduction. The resistors corresponding to resistor 63 for the grids of the digit tubes of higher value—for instance, resistor 57 associated with the "2" tube—normally constitute part of the cathode supply circuit of the next lower value tube.

Switches, such as switch 55, in the normal unoperated condition as shown in the drawings, connect the cathode of its associated tube with the control grid of the next higher tube, and hence, for instance, if the "1" tube fires, the rise in its cathode potential is impressed in part through resistor 54, switch 55, point 56, resistor 65, and resistor 66, and will be sufficient to overcome the controlling bias on the "2" tube grid and cause it to fire and become conducting. As each digit tube fires, the initial current through it is high during the time the capacitor connecting the cathode to the output conductor 60 is being charged, and the common anode resistors such as resistors 46 (Fig. 5) and 51 and 53 (Fig. 11) cause the anode of the tube commencing to conduct to drop sharply in potential, momentarily, which potential drop is impressed on the anodes of all the associated digit tubes, and, in the case of the units bank, on the anodes of the D tube and the T tube as well. Any conducting digit tube will be extinguished as another tube of the bank fires, because, if a tube has been conducting, the capacitor connecting its cathode to the output conductor will have been charged, and, as its anode drops in potential due to another tube firing, its cathode will be sustained temporarily at a relatively high level, and the anode potential will fall below the potential of the cathode, causing the tube to deionize, allowing the control grid to resume control. This method of extinction of a conducting tube by means of causing its anode potential to drop below cathode potential when another tube on the common anode supply circuit fires has been disclosed in my co-pending application for United States Letters Patent, Serial No. 395,995, which was filed May 31, 1941, and which issued on June 4, 1946, as Patent No. 2,401,657.

When the "1" tube in a bank fires and becomes conducting, there is no other tube in that bank at that time conducting, so the extinguishing action in a particular bank is operative when those tubes higher than the "1" tube in a bank become conducting; as, for instance, if the "1" tube is conducting and the "2" tube is fired automatically, thereafter, that firing of the "2" tube will extinguish the "1" tube or any other digit tube. However, when the "1" tube in a bank fires, the potential of terminal 58 receives a momentary dip which is impressed on the anodes of all tubes in other banks connected thereto. This effect on other banks will extinguish any conducting digit tube therein.

If no key in a bank is operated, that bank is by-passed as far as the digit tubes are concerned, and only the D tube of that bank will fire, followed by the firing of the T tube. The firing of the T tube ends the operation of the bank and passes on an impulse to the next lower bank, which impulse is created by the rise in potential of its cathode as conduction commence in the tube. The impulse generator is arranged in this disclosure to operate bank by bank in sequence from the highest order bank to the lowest order bank, to prevent any interference in transfer of carry-over data in the accumulator, and therefore the T tube output of any particular bank is connected to the input conductor of the next lower bank, except that the units bank output terminal 115 is connected to the tally unit operation initiating unit relay (Fig. 11), to be described, either to initiate a recycling of the whole operation of the impulse generator or to cause it to cease operating, as at the end of a calculation.

To commence the operation of a bank of the impulse generator, provision has been made that, if no key in the bank is operated, the normally controlling potential bias of the D tube is relieved, or primed, to near the firing point, and, if a key in the bank is operated, the normally controlling bias of the "1" digit tube is relieved or primed. To actually start the operation of a bank, a positive potential impulse must be impressed on an input terminal, such as terminal 78 (Fig. 5), serving the units bank, which impulse is impressed through capacitors 660 of .0001 microfarad and 67 of .001 microfarad, capacitor 660 being connected to grid bias point 68 of the "1" tube and capacitor 67 being connected to grid bias point 69 of the D tube. The positive potential impulse starting an operation of the bank, therefore, tends to cause both the "1" tube and the D tube to fire and become conducting.

The priming of the D tube when no key is depressed is arranged to make it and not the "1" tube responsive to the starting impulse. When a key is depressed, the "1" tube is arranged to be responsive to a starting impulse, and not the D tube. Still taking the units bank (Fig. 5) as an example, the selective priming potential for the D and "1" tubes of the bank is obtained from ground through resistor 70 (Fig. 5) of 100,000 ohms and switch 71. A key detent bar 72 is normally maintained in the position shown in Fig. 5 by a spring 73, and studs 74 thereon hold switch 71 against the contact 76 conveying ground potential through to point 69, priming the D tube. If a key in the bank is operated, as, for instance, the "4" key, a cam surface 89 thereon operates against the surface 90 inside the key slot to move the bar 72 to the left, which moves switch 71 to contact 91, thus, through conductor 77, priming point 98 and thereby the "1" tube grid so that the "1" tube will respond to a starting impulse and the D tube will not respond. The input starting impulse impressed on terminal 78 is adjusted to differentiate between the primed and unprimed tubes.

Another function of the operation of any key is to break the normal connection between the cathode of its associated tube and the control grid of the next higher tube in the bank and to connect the said cathode of the tube associated with the key to the control grid of the D tube. Thus, digit tubes in a bank, if any are selected by operation of a key, will fire automatically one at a time in sequence, beginning with the "1" tube and ending with the tube associated with the operated key, impressing on the associated output conductor the number of impulses represented by that key. Thereafter the D tube is fired, followed by the T tube, to conclude the operation of the bank.

For instance, if key "1" is operated, contact 76 is disconnected from ground and switch 55 will bridge the lower contacts and connect the cathode of the "1" tube to conductor 93, which leads to point 69, which is in the grid circuit of the D tube. As has been explained earlier herein, the D tube is given a sufficient bias that it will not respond to impulses applied to it over terminal 78 unless it has been primed by having point 69 in its grid circuit connected to grounded contact 76. Even though the prime has been removed by the operation of the "1" key, the D tube will operate after the last tube of the series to fire because the potential impulse which it receives over conductor 93 from the last tube to fire, of the digit tubes selected, is great enough, even in the unprimed condition of the D tube, to cause the grid to lose control and consequently cause the firing of the D tube. The capacitors associated with the negative potential supply circuit of the grids of the digit tubes in a bank higher than the "1" tube, such as capacitor 58 connecting grid bias point 56 of the "2" tube to the negative 170-volt conductor 48, delay, for a short period while charging, the firing of the next digit tube after the commencement of conduction in the preceding tube. Consequently, such capacitors, as capacitor 58, control the timing of the output impulses from the impulse generator, and, with the values of circuit elements and potentials given, the interval involved between any two output impulses in the same bank is of the order of .0001 second. It is apparent, however, that timing adjustments may be made to satisfy any desired speed of operation up to the limit of the tube response.

The D tube (Fig. 5) obtains its cathode potential on one side from ground through a resistor 94 of 25,000 ohms and on the other side from the negative 170-volt conductor 48 through resistors 95 of 60,000 ohms and 96 of 100,000 ohms. The cathode is also connected to ground through capacitor 97 of .001 microfarad to cause the drop in the anode supply conductor to extinguish the last digit tube to fire on the event of the firing of the D tube. The value of grid resistor 981 is 50,000 ohms, and the value of resistor 99 is 100,000 ohms. Point 100 is connected to the grid of the T tube through resistor 101 of 50,000 ohms to furnish it with its normal controlling bias. The cathode of the T tube obtains its potential from ground through resistor 437 of 25,000 ohms, which is in parallel with a capacitor 102 of .001 microfarad, and through its connection over resistor 4381 to negative 170-volt conductor 48. The rise in potential of points 100 as tube D fires automatically fires the T tube. Capacitor 103, of .005 microfarad, is a timing capacitor, delaying the firing of the T tube for an interval after the firing of the D tube.

Figure 6:
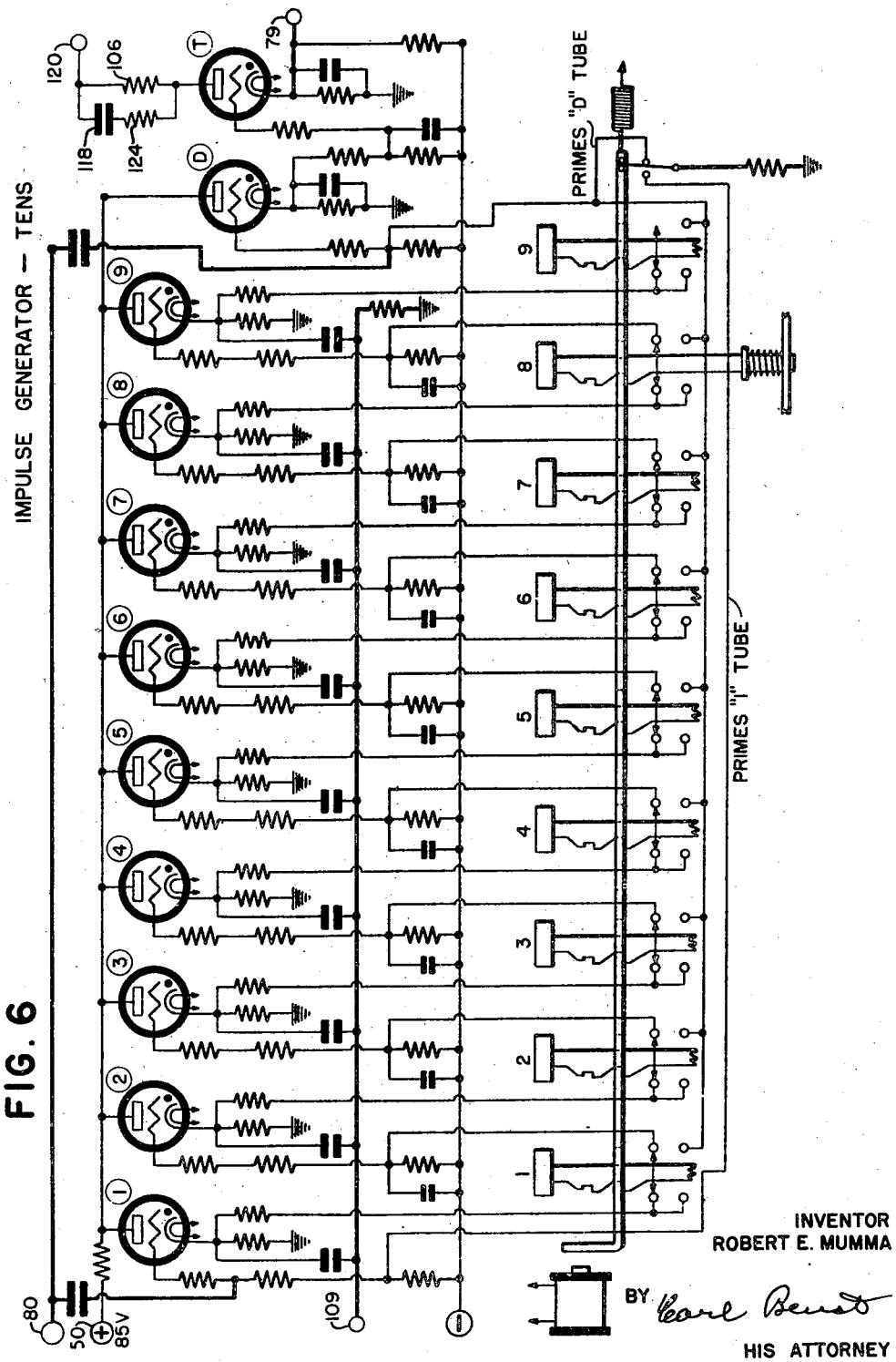

The anode potential supply of the T tubes in the banks higher than the units bank are separate from that of the digit and bes of the bank. Referring to Fig. 6 as typical, the T tubes of higher order banks receive their anode potential through a common point 120 (see also Fig. 11) each through a resistor, like resistor 106, of 250,000 ohms. Each resistor, like resistor 106, is shunted by a capacitor, like capacitor 118 of .005 microfarad, in series with a resistor, like resistor 124 of 5,000 ohms. Referring to Fig. 11, terminal 120 is connected to an 85-volt potential source through a resistor 121 of 10,000 ohms and is connected to ground through a resistor 184 of 8,000 ohms. Therefore, the T tube of the tens bank when fired stays conducting until tube 123 (Fig. 11) fires and becomes conducting, as will be explained, and the T tubes of the banks higher than the tens bank will be extinguished on the event of the T tube of the next lower bank firing, due to the common anode resistance (see Fig. 11) and the individual cathode-ground capacitors. The T tube of the units bank is extinguished by the event of the firing of the tube 116 (Fig. 11), which event is initiated by reason of the cathode rise in potential of the units T tube (Fig. 5) being impressed on terminal 115 (Figs. 5 and 11).

It will be understood, then, that the banks of the impulse generator fire in sequence from the higher orders toward the units order, the digit tubes in banks in which keys have been operated firing sequentially in the bank, followed by the firing of the D tube and the T tube. In the case of a bank in which no key has been operated, then only the D tube and the T tube of that bank will be rendered conducting in succession.

At the end of a calculating operation, a key release solenoid for each bank may be activated and return the keys to home position under the action of individual springs, such as spring 140 (Fig. 5).

Figure 7:
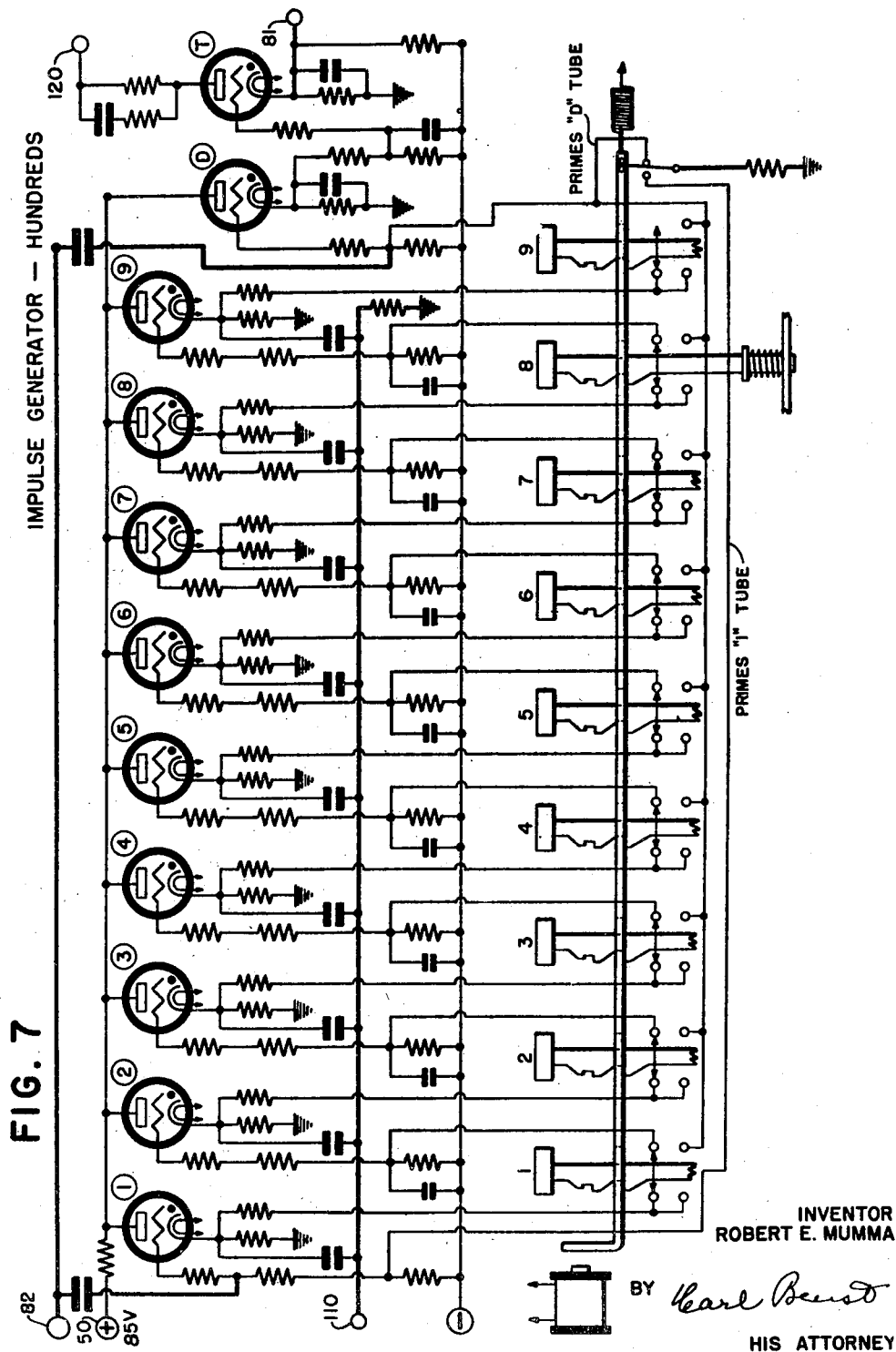
Figure 9:
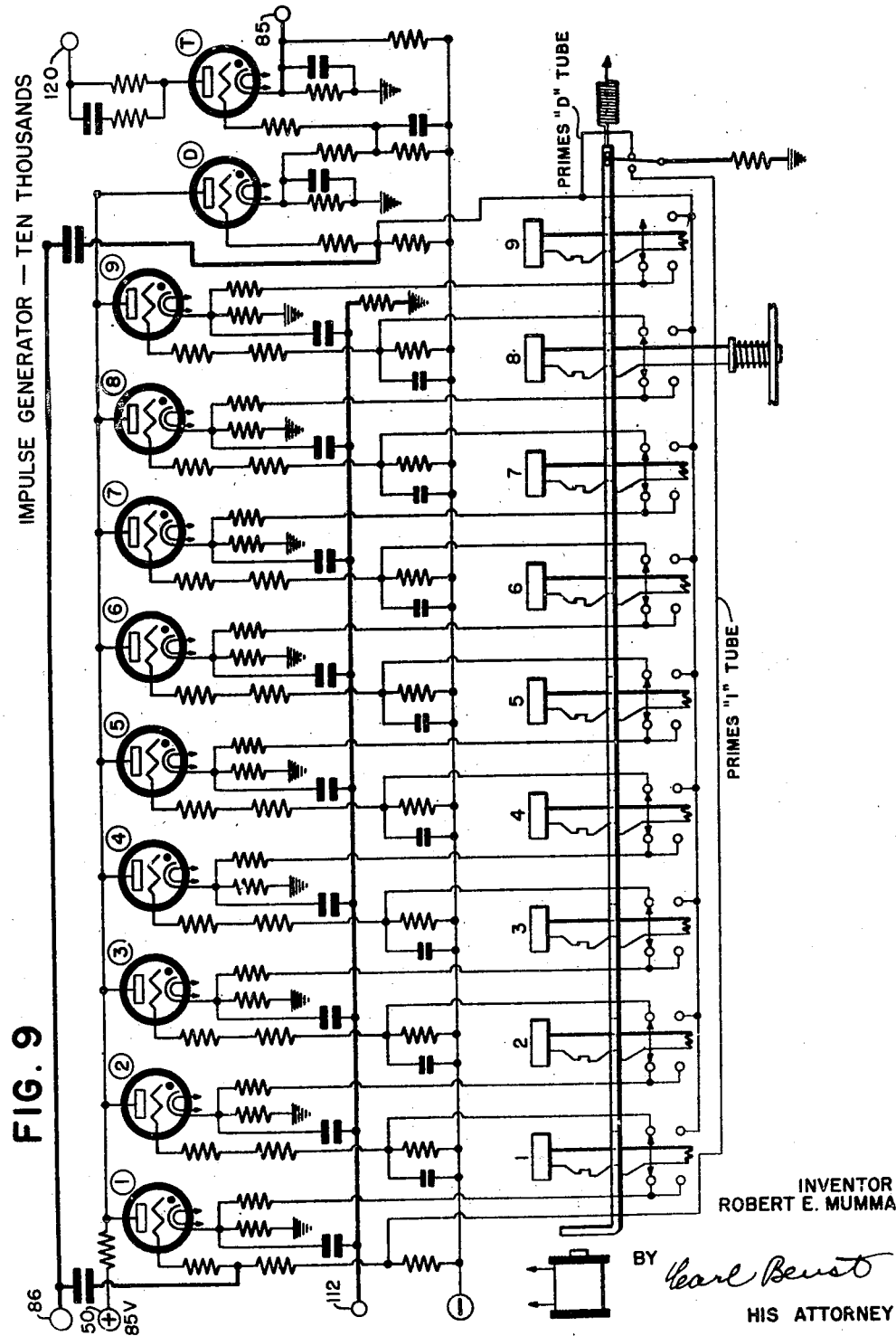
Figure 10:
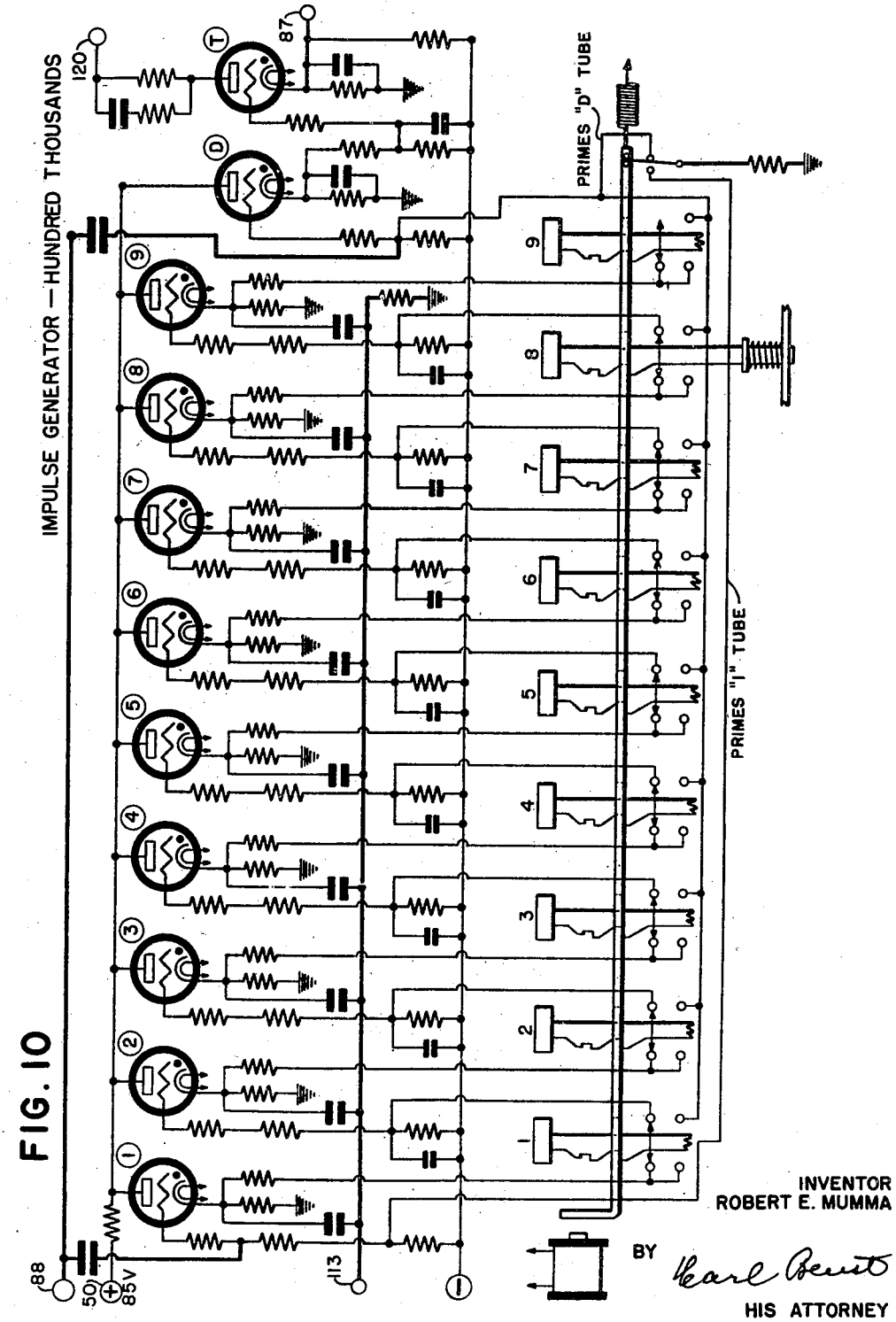

The operation of the impulse generator in single entries into an accumulator, such as in addition and subtraction operations, is initiated by a potential impulse applied to terminal 88 of the hundred thousands bank (Fig. 10). The output from its T tube at terminal 87 is connected to the input terminal 86 of the ten thousands bank (Fig. 9). The output terminal 85 of the T tube of the ten thousands bank is connected to the input terminal 84 of the thousands bank (Fig. 8). The output terminal 83 of the T tube of the thousands bank is connected to the input terminal 82 of the hundreds bank (Fig. 7). The output terminal 81 of the T tube of the hundreds bank at terminal 81 is connected to input terminal 80 of the tens bank (Fig. 6). The output terminal 79 of the T tube of the tens bank is connected to the input terminal 78 of the units bank (Fig. 5).

In calculating operations requiring a succession of entries into the accumulator, such as multiplying, the higher two banks of the impulse generator are by-passed, as has been said, and initiation of a multiplying operation is commenced by impressing the initiating positive impulse on terminal 84 (Fig. 8), as will be explained.

It is evident that the impulse generator is not restricted in principle to the decimal numerical base, as any number of digit tubes may be placed in each bank. Neither is the impulse generator restricted in the number of banks used.

The impulse generator is recycled as many times as selectively determined by the tally impulse generator unit, and the output impulses of any one cycle may be routed as determined by the stage of the calculation to the proper denominational orders of an accumulator.

The closing of switch 52 (Fig. 11) prepares the impulse generator for operation by supplying anode potential to the digit tubes.

*Relaying end of operation impulses from impulse generator to tally unit*

Tubes 116, 122, and 123 (Fig. 11) prepare the impulse generator for another cycle and initiate operation of the tally unit.

Each of the tubes 116, 122, and 123 (Fig. 11) has its cathode grounded on one side through a resistance, like resistance 125, in parallel with a capacitor like capacitor 126. Resistors 125, 127, and 128 are, respectively, of 50,000 ohms, 25,000 ohms, and 60,000 ohms, and capacitors 126, 129, and 130 are, respectively, of .004 microfarad, .0005 microfarad, and .002 microfarad. On the other side, each of the cathodes is connected to a negative 170-volt conductor 144 through a resistor or resistors, said resistors having the following values: resistor 156—150,000 ohms, resistor 133—25,000 ohms, resistor 161—150,000 ohms, and resistor 162—500,000 ohms. The cathode of tube 116 is coupled through a capacitor 131 of .0001 microfarad to point 132 in the grid circuit for tube 120. A resistor 158 of 250,000 ohms connects point 132 to point 142 in the grid potential supply circuit of tube 122; the cathode of tube 122 is connected through resistance 133 to grid bias point 143 of tube 123; and the cathode of tube 123 is connected to input conductor 134 for the relay tubes 150, 151, 152, and 153, each associated with a denomination of the tally impulse generator unit to be discussed later. Capacitor 1341 is provided as a time delay and may be of .01 microfarad. The grid of tube 116 receives its normal bias potential and firing potential from the cathode of the T tube of the units bank of the impulse generator through terminal 115 (Figs. 5 and 11), which has a normal potential of about 22 volts negative, when the T tube is not conducting being connected to ground through 60,000-ohm resistor 437 and connected to the negative 170-volt supply conductor 48 through 400,000-ohm resistor 4381. The grids of tubes 122 and 123 (Fig. 11) receive their normal controlling grid bias potential from points 142 and 143, respectively, each being positioned in a potential divider located between negative 170-volt supply conductor 144 and ground. Resistors 159 and 160 are of 40,000 ohms and 100,000 ohms respectively, and resistors 133 and 161 have been specified earlier herein. The anodes of tubes 122 and 123 receive potential from point 120, the anode of tube 122 being isolated by resistor 163 of 7,500 ohms. Suitable values for resistors 155 and 157 are 500,000 ohms and 50,000 ohms respectively. With such circuit values, the tubes 116, 122, and 123 fire one after another when the cathode potential rise, resulting from the units bank impulse generator T tube firing (Fig. 5), is impressed on terminal 115 (Figs. 5 and 11). The circuit values of capacitance and distributed inductance incident to normal wiring, and the combination of low resistance in the anode supply circuit with high resistance in each tube's cathode supply circuit shunted by a capacitor immediately causes each of the said tubes 116 and 123 to self-extinguish after it fires, as the initial high current flowing through a tube during the time the cathode capacitor is charging causes an ensuing oscillatory rise in cathode potential as the high tube current is abruptly terminated, which rise overshoots the anode potential. Tube 122 is extinguished on the firing of tube 123 as the common anode supply point drops in potential. Therefore, each of these tubes 116, 122, and 123, after firing, is reset ready for another operation.

Tubes 150, 151, 152, and 153 are individually primable gaseous triode tubes, used as relays, and are each arranged in a circuit having self-extinguishing action similar to the circuits of tubes 116 and 123. Sufficient anode-cathode potential is given constantly to all of the tubes 150, 151, 152, and 153 to maintain conduction therein, but the grids of the tubes are normally biased to prevent firing even when a positive potential impulse over input conductor 134 is impressed commonly on the grids, each grid being connected to conductor 134 through a capacitor of .00025 microfarad, like capacitor 165, in series with a resistor of 50,000 ohms, like resistor 166. The grid bias potential is supplied to each grid individually at a point, like point 167, through a resistor like resistor 168 of 250,000 ohms, and a terminal like terminal 169 (see also Fig. 13). Terminal 169 (Fig. 13) is connected to the potential supply circuit of the cathode of tube 1920, and the potential of terminal 169, due to the resistance in the cathode potential supply of tube 1920, is raised when tube 1920 is conducting as compared to when tube 1920 is in non-conducting condition. Such rise in potential primes the grid of tube 150 (Fig. 11) to a point where it is fired by an impulse impressed on conductor 134. In a similar manner, terminals 171, 172, and 173 (see also Fig. 13) are similarly primed by conduction, respectively, in tubes 2070, 2060, and 2050. More will be said about tubes 1920, 2070, 2060, and 2050 in connection with the description of the stage control unit, of which tubes 1920, 2070, 2060, and 2050 are a part.

The anodes of tubes 150, 151, 152, and 153 (Fig. 11) receive their potential supply from 85-volt positive source 1730 through resistor 175 of 50,000 ohms and resistor 176 of 1,000 ohms, after the closing of switch 174. Point 177 is grounded by resistor 178 of 15,000 ohms in parallel with capacitor 179 of .01 microfarad introduced into the circuit to insure stability of potential supply. Each cathode is grounded through a resistor like resistor 180 of 60,000 ohms shunted by a capacitor like capacitor 181 of .001 microfarad, and each is connected to negative 170-volt conductor 183 through a resistance, like resistance 182 of 250,000 ohms. The stated values of circuit elements of resistance and capacitance with the distributed inductance in normal wiring will cause any one of the tubes to immediately self-extinguish when fired due to the oscillatory rise in potential of the cathode, as has been explained for other tubes. Each time the impulse generator completes a cycle, that one of the tubes 150, 151, 152, and 153 which is primed, fires and self-extinguishes, passing on a positive potential impulse on the associated one of the cathode output terminals 185, 186, 187, and 188, to cause a step of operation of an associated denomination of the tally unit impulse generator, as will be described.

*Tally unit for controlling number of impulse generator cycles in each of selected stages*

There has been described, heretofore, the impulse generator including the impulse generator operation initiating input terminal 84 (Figs. 8 and 12) and operation initiating input terminal 88 (Figs. 10 and 12) for initiating multiple-cycle impulse generator operations and single-cycle impulse generator operations, respectively. Such initiating impulses originate in the tally counting unit shown in Figs. 1, 2, 3, and 4 under control of the circuits of Fig. 13, and are relayed by the circuits of Fig. 12 to the selected one of terminals 88 and 84.

Referring to Fig. 12, gaseous triode electron tube 200 relays recycling impulses from the tally unit impulse generator (Figs. 1–5) to the thousands bank of the impulse generator. The cathode of tube 200 is connected by conductor 201 to terminal 84 (see also Fig. 8), and, each time tube 200 fires, terminal 84 is given a positive potential impulse. Gaseous triode electron tube 202 relays recycling impulses from the tally unit impulse producer to the hundred thousands bank of the impulse generator. The cathode of tube 202 is connected by conductor 203 to terminal 88 (see also Fig. 10), and, each time tube 202 fires, terminal 88 is given an impulse.

Tube 200 is self-extinguishing and is supplied with 85 volts anode potential by source terminal 204, through resistor 205 of 10,000 ohms and resistor 206 of 1,000 ohms. Point 207 is coupled to ground through resistor 208 of 25,000 ohms in parallel with capacitor 209 of .05 microfarad. The cathode is grounded through resistor 210 of 75,000 ohms in parallel with capacitor 211 of .00015 microfarad. The grid is connected to biasing point 212 through resistor 213 of 50,000 ohms and resistor 214 of 500,000 ohms. Point 212 normally is given a controlling bias potential of about 20 volts negative by being connected to ground on one side by resistor 215 of 40,000 ohms, conductor 216, switch 217, and switch 218, and connected on the other side to a negative 170-volt source through a resistor 219 of 300,000 ohms. Tube 202 has anode and cathode potential supply circuits similar to tube 200 except that, normally, point 220 is connected to the ground 223 through a resistor 222 of 400,000 ohms, making the normal controlling bias of its grid over 100 volts negative. Therefore, with neither key 225 nor 226 operated, an impulse of approximately 30 volts positive impressed on the grids of tubes 200 and 202 from point 224, through capacitors 244 and 243, will fire only the tube 200 and relay the impulse through terminal 84, initiating the operation of a cycle of the impulse generator at the thousands bank. However, if either "add" key 225 or "subtract" key 226 is operated, the connection of the point 212 to ground 221 is broken, which is supplanted by connection to ground 227 through resistor 228 of 400,000 ohms, preventing tube 200 from firing on a 30-volt positive signal. On the other hand, point 220 is connected to ground 221, rendering tube 202 responsive to a 30-volt positive signal from point 224, which relays a cycling impulse to the hundred thousands order of the impulse generator instead of to the thousands order. In this manner, the type of calculating operation determines the starting point in the impulse generator for a cycle of operation thereof. It is to be noted that "add" key 225 and "subtract" key 226 also may be utilized to control various other units of a calculating machine, as set out in my co-pending application Serial No. 515,718, now Patent No. 2,442,428 referred to.

Gaseous triode electron tubes 230, 231, 232, and 233 are relays, respectively, for the impulses produced by the thousands, hundreds, tens, and units banks of the tally impulse unit shown in Figs. 1, 2, 3, and 4. As any one of these tubes 230 to 233 fires, a rise in cathode potential ensues, sending a positive impulse on common cathode conductor 234 to fire either tube 202 or 200, whichever is selected. The relay tubes 230 to 233 are self-extinguishing. All the anodes receive a potential from a common 85-volt positive source terminal 235 through resistor 236 of 7,500 ohms, point 237, and resistor 238 of 1,500 ohms. Point 237 is coupled to ground by resistor 239 of 15,000 ohms in parallel with capacitor 240 of .01 microfarad. The cathodes of tubes 230, 231, 232, and 233 receive their potential from conductor 234, connected to ground through resistor 241 of 50,000 ohms in parallel with capacitor 242 of .001 microfarad. Output point 224 is coupled electrostatically to the grids of tubes 202 and 200 by capacitors 243 and 244, each of .00005 microfarad. The grids of tubes 230—233 are each connected through a resistor like resistor 245 of 50,000 ohms, a point like point 246, and a resistor like resistor 247, to conductor 248, which is given a controlling potential of about 14 volts negative, being connected through resistor 249 of 15,000 ohms to ground and being connected through resistor 250 of 200,000 ohms to negative 200-volt source terminal 251.

Figure 4:
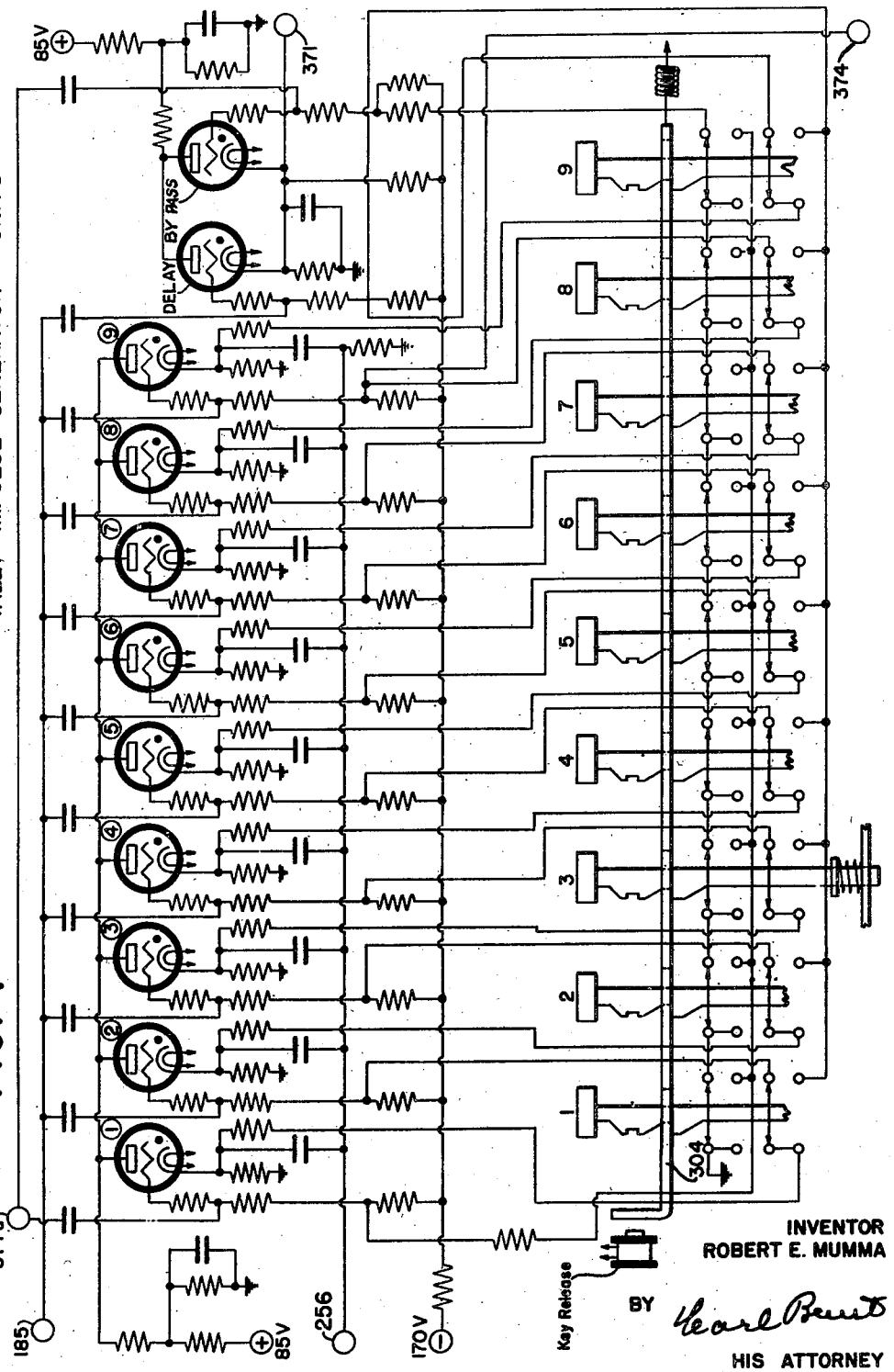

Each grid point like point 246 is coupled through a capacitor of .0001 microfarad, like capacitor 252, to a terminal like terminal 253. Terminal 253 is connected to the output conductor of the thousands bank of the tally impulse generator (Fig. 1), terminal 254 is connected to the output conductor of the hundreds bank (Fig. 2), terminal 255 is connected to the output conductor of the tens bank (Fig. 3), and terminal 256 is connected to the output conductor of the units bank (Fig. 4). These terminals, when given a positive impulse, will fire the associated one of relay tubes 230—233 and impress a positive impulse on conductor 234. After each relay tube fires, it will be self-extinguished because of the circuit elements described, in the same manner as the other self-extinguishing tubes heretofore described.

*Circuits controlling the stages of a calculating operation*

Referring to Fig. 13, there is shown a plurality of pairs of gaseous electron tubes, one of each pair controlling an associated stage priming group of the conductors which may be used to control the routing of impulses issuing from the impulse generator shown in Figs. 5, 6, 7, 8, 9 and 10, and the other tube of each pair controlling the corresponding stage of the tally unit impulse generator shown in Figs. 1, 2, 3, and 4.

The stages of a calculating operation will be designated I, II, III, and IV, stage I being that in which a selected multiplicand as set up by the keys of the impulse generator is produced as a pattern of impulses as a number of times as though multiplied by the units denomination of the selected multiplier as set up on the keys of the tally unit impulse generator, to be described. Addition or subtraction is performed as a multiplication by one, and, therefore, addition or subtraction is a stage I calculation.

A start key 260 (Fig. 13), when operated, closes switch 261 to ground the conductor 262. A priming electron tube 263 of the gaseous triode type is fired by having the potential of its grid, normally maintained at about 40 volts negative by being connected through 50,000-ohm resistor 264, point 265, resistor 266 of 500,000 ohms to point 267, which point is connected to ground through resistor 268 of 60,000 ohms and to negative 170-volt supply conductor 269 through resistor 270 of 200,000 ohms, raised to the firing point by reason of its grid bias point 265 being coupled to said conductor 262 through capacitor 271 of .00025 microfarad. The cathode of priming tube 263 is grounded on one side through a resistor 272 of 75,000 ohms in parallel with a resistor 273 of 5,000 ohms in series with capacitor 274 of .001 microfarad, and is connected on the other side to the negative 170-volt conductor 269 through resistor 288 of 375,000 ohms. The anode is supplied with potential by being connected by conductor 275 to conductor 276, serving the tubes 2050, 2060, 2070, and 1920 with anode potential. Conductor 276 is connected through resistor 281 of 22,500 ohms, point 282, and resistor 283 of 100 ohms to an 85-volt positive source of potential. Point 284 is grounded through resistor 285 of 7,500 ohms and capacitor 286 of .01 microfarad in parallel with resistor 287 of 15,000 ohms. Under these circumstances, when the "Start" key switch is closed, the priming tube 263 will fire and become conducting, the capacitor 274 will charge, and the potential of the cathode of tube 263 will thereafter rise. That rise in cathode potential is used for priming the grid of a selected one of the tubes 2050, 2060, 2070, and 1920. In the adding position of switch 291, the tube 1920 is primed. In the multiplying position of switch 291, that one of tubes 2050, 2060, 2070, and 1920, as determined by detent-operated switches 306—309, is primed. The circuits for such priming will be traced in what follows. The common anode supply conductor 276 for the priming tube 263, and tubes 2050, 2060, 2070, and 1920, will receive a drop in potential as any of the tubes 2050, 2060, 2070, and 1920 fire and become conducting, because these last-mentioned tubes have their cathodes coupled electrostatically to ground, and, while the cathode-ground capacitor is charging on commencement of conduction in the associated tube, the potential of conductor 276 drops momentarily to within about 15 volts of ground. At this time, the priming tube's cathode potential is far above ground by reason of its cathode-ground capacitor's having been charged, and the ensuing dip of its anode potential causes a momentary cessation of anode-cathode potential, and the priming tube 263 is extinguished, the grid having resumed its normal controlling bias. Therefore the priming tube conducts and primes until the first one of tubes 2050, 2060, 2070, and 1920 becomes conducting.

The add-subtract and multiplying key 290 is provided with two switches 291 and 292. Switches 291 and 292 on the upper contacts prepare the tally impulse producing device for an adding or subtracting operation and on the lower contacts prepare that device for a multiplying operation.

In an adding operation, the cathode of the priming tube 263 is connected through point 293, resistor 294 of 500,000 ohms, switch 291, in upper position, conductor 295, points 296 and 297, resistor 298 of 500,000 ohms, point 299, and resistor 300 of 50,000 ohms to the grid of tube 1920, priming it, as tube 263 conducts. Terminal 374 (see also Fig. 4) connected to point 296 also primes the "9" tube of the units bank of the tally impulse generator, which "9" tube will thereafter be fired by the firing of tube 280 (Fig. 13), causing a potential rise on terminal 185, as will be explained more in detail.

In multiplying operations, that one of tubes 2050, 2060, 2070, and 1920 to be primed depends on what multiplier is set up on the keys of the tally impulse generator (Figs. 1, 2, 3, and 4), switching being provided so as to prime that stage control tube of the unit of Fig. 13 which is associated with the highest denomination significant digit of the selected multiplier number. Thus, if the multiplier is "5670," stage IV is primed; if the multiplier is "672," stage III is primed; if the multiplier is "54," stage II is primed; and if the multiplier is "8," stage I is primed. The operation of a key in a bank of the tally impulse generator (Figs. 1, 2, 3, and 4) moves an associated detent bar, that for the thousands bank being 301 (Figs. 1 and 13), that for the hundreds bank being 302 (Figs. 2 and 13), that for the tens bank being 303 (Figs. 3 and 13), and that for the units bank being 304 (Figs. 4 and 13). The potential of switch point 305 (Fig. 13) is normally carried through detent bar operated switches 306, 307, 308, and 309 to dead contact 310. The highest denominational key of the tally impulse generator that is operated in a given calculation moves the associated detent bar, switching the connection of point 305 to the associated stage tube. Thus, if a thousands bank key is operated in the tally impulse generator unit (Fig. 1), switch 306 (Fig. 13) will be moved by the detent bar 301 to contact 311, connected through resistor 312 of 50,000 ohms to the grid bias point 313 of tube 2050, representing stage IV of a calculating operation. The effect of movement of detent bars 302, 303, and 304 similarly makes contact with switch points 315, 316, and 317, leading, respectively, to the grid bias points 318, 319, and 299, respectively, of tubes 2060, 2070, and 1920. It is apparent that the highest denominational switch of switches 306, 307, 308, and 309 that is operated carries the potential of point 305 to its associated tube to the exclusion of the lower stage tubes. Thus, with the key 290 set to multiplying position, tube 263, upon firing, primes the stage tube associated with the highest significant multiplier digit.

The cathode of each of stage control tubes 2050, 2060, and 2070 is given its potential supply by being connected to ground on one side through a resistor of 25,000 ohms, like resistor 320, in parallel with a capacitor of .002 microfarad, like capacitor 321, and on the other side to negative 170-volt conductor 269 through a resistance of 15,000 ohms, like resistor 322, a point like point 323, a resistor of 7,500 ohms, like resistor 324, a point like point 325, a resistor of 15,000 ohms, like resistor 326, a point like point 327, a resistor of 2,500 ohms like resistor 328, a point like point 329, and a resistor of 50,000 ohms like resistor 330. The cathode supply of tube 1920 is slightly different. The difference in the arrangements of resistors in the cathode supply of tube 1920, as compared to the tubes 2050, 2060, and 2070 relates to its priming action on the key release tube 2400 as well as its firing effect upon its companion tube 280.

The resistances leading from the cathode of a stage control tube—for instance, tube 2050—to the negative 170-volt conductor 269 form a multiple potential divider. At point 323, a connection is made through a resistance of 100,000 ohms, like resistor 331, a point, like point 332, and a resistance of 50,000 ohms, like resistor 333, to the grid of the companion tube 277 of the pair constituting stage IV. Conduction in tube 2050 raises the normal controlling potential bias of tube 277 to fire it after the charging of grounded delay capacitor 334 of .005 microfarad. Point 325 is given a lesser potential rise as tube 2050 commences conduction, which is impressed on teminal 2260 and may be used, as shown in my Patent No. 2,442,428, to control the routing of stage IV impulses to an accumulator. Point 327 is given a slightly lesser potential rise as tube 2050 commences conduction, which is conveyed by terminal 173 (see also Fig. 11) to prime tube 153, which relays stepping impulses from the impulse generator to the thousands, or stage IV, bank of the tally unit impulse generator (Fig. 1). Point 329, given a slightly lesser rise in potential, is connected through a 150,000-ohm resistor, like resistor 335, to prime the grid bias point 318 of tube 2060, representing stage III of a calculating operation. Thus, the stage control tube 2050, when conducting, primes the stage control tube 2060, just as priming tube 263 primes the stage control tube 2050 in calculations involving stage IV.

The change in potential of the cathode of tube 2050 is from about 38 volts negative in the nonconducting state to about 35 volts positive in the conducting state. The resistances in the potential divider circuit connecting the cathode to the negative 170-volt conductor have been chosen so as to prime or fire the associated controlled tubes as the operation demands.

The grid bias of stage control tube 2050 is normally adjusted by a potential divider, consisting of resistors 336 and 337 connected between ground and the negative 170-volt supply conductor 269, to about 75 volts negative, point 338 being connected through resistor 312 of 500,000 ohms to the bias point 313. Priming potential impressed on point 338 from the cathode of the priming tube 263 makes the grid of tube 2050 more positive to bring it to about several volts more negative than the firing point. Thus, a small positive impulse on input conductor 340, impressed through a capacitor, like capacitor 341 of .00005 microfarad, onto the grid, will fire the tube 2050 to the exclusion of the other of stage tubes 2060, 2070, and 1920, if detent bar 301 has been moved by a key having been operated in the thousands bank of the tally unit impulse generator. Similarly, if detent bar 302 of the hundreds tally denominational order is the highest stage selected, tube 2060 will be the first to fire, and tubes 2050 and 277 will not fire in that calculating operation. The same is true with stage II and stage I, as is obvious. On adding operations, stages IV, III, and II are cut out entirely, the priming tube 263, as has been stated, priming the tube 1920 associated with stage I even though no key has been operated in the units bank of the tally unit.

The starting impulse is generated by gaseous triode tube 342, which is fired by delay tube 343 of the same type, which tube 343 is fired also by the closing of starting switch 261. Delay tube 343 is supplied with anode potential by being connected to point 344 by conductor 345, resistor 346 of 200,000 ohms in parallel with capacitor 347 of .002 microfarad and resistor 348 of 10,000 ohms. The cathode of tube 343 receives its potential by being grounded through resistor 349 of 25,000 ohms. The grid of tube 343 receives a normal controlling bias potential through resistor 350 of 500,000 ohms, point 351, resistor 352 of 400,000 ohms in parallel with capacitor 353 of .01 microfarad, and conductor 354, which is connected to the negative 170-volt conductor 269. On the closing of switch 261, tube 343 fires and becomes conducting after capacitor 353 charges, and, in so doing, the cathode rises in potential from ground to about 45 volts positive as capacitor 347 charges, which 45-volt rise in potential is impressed through capacitor 356 of .00005 microfarad onto grid bias point 357 of "Start" tube 342, normally at a controlling potential of 16 volts negative, by being connected through resistor 358 of 300,000 ohms to point 359, which is connected to ground through resistor 360 of 40,000 ohms and to the negative 170-volt conductor 269 through resistor 361 of 400,000 ohms.

The cathode of "Start" tube 342 is grounded through a 50,000-ohm resistor 362, and the anode is connected through resistor 363 of 1,500 ohms and conductor 364 to point 365, connected to the 85-volt positive terminal on one side through resistors 285 and 283, before mentioned, and to ground through resistor 287 and capacitor 286, before mentioned.

As starting tube 342 fires and becomes conducting, a positive potential impulse is impressed through a capacitor 366, of .01 microfarad, onto conductor 340 so that approximately a 25-volt signal is impressed through all the capacitors 341, 367, 368, 369, and 370, firing the primed one of tubes 2050, 2060, 2070, and 1920. The key release tube, connected to input conductor 340, is never fired by the start tube, as it is never primed at the time the start tube fires, but it is fired by an impulse from terminal 371 emanating from the units bank of the tally impulse generator unit after tube 1920 has become conducting. Impulses on conductor 340 fire any primed tube of the tubes 2050, 2060, 2070, 1920, and the "key release" tube 2400.

Suppose, for example, tube 2070 had been fired by the start tube 342, due to detent bar 303 having been moved and it being associated with the denomination of the highest significant digit set up on the tally keys, then the rise in its cathode potential will do the following things:

(a) Extinguish the "priming tube" 263, as has been explained;

(b) Fire the tube 279 paired with it as the stage II controls;

(c) Prime terminal 2150;

(d) Prime, through terminal 171 (see also Fig. 11), the stage II relay tube 151; and (e) Through conductor 372, prime the tube 1920 to be responsive, by firing on receiving an impulse on its grid, impressed on terminal 371 and conductor 340.

As the associated stage II tube 279 fires and becomes conducting, terminal 373 (see also Fig. 3) receives a positive potential impulse, which initiates operation in the tens bank of the tally impulse generator unit. In a similar manner, an impulse on terminal 375, when tube 277 fires, (see also Fig. 1) initiates operation of the thousands bank or stage IV of the tally impulse generator unit; an impulse on terminal 376 (see also Fig. 2) when tube 278 fires initiates operation in the hundreds bank or stage III of the tally impulse generator unit; and an impulse on terminal 377 initiates operation in the units bank or stage I of the tally impulse generator unit.

Each of the tubes 277, 278, 279, and 280 obtains anode potential from conductor 2770, connected through resistor 2771 of 7,500 ohms and resistor 283 to the positive 85-volt terminal, the connection of each anode to conductor 2770 being made by a resistor, like resistor 2772, of 250,000 ohms, in parallel with a capacitor, like capacitor 2773, of .002 microfarad. Each cathode is grounded through a resistor, like resistor 2774 of 25,000 ohms. Consequently, as a tube, like tube 277, fires, the cathode rises sharply in potential while the anode capacitor is charging, which rise gradually subsides as the said capacitor charges and the large anode resistor comes into effect. The consequence is to cause an impulse at the cathode which is impressed momentarily on the associated output terminal, such as terminal 375 associated with tube 277.

Only in the multiplying position of key 290 (Fig. 13) is the cathode of tube 280 (Fig. 13) connected to terminal 377a of Fig. 4 by way of conductor 378, switch 292 (in lower position), and conductor 380, for, when the switch 292 is in the upper or add-subtract position, the positive rise in potential of terminal 377 is impressed on conductor 381 and terminal 185 (see also Fig. 4), which is the input conductor for the units bank of the tally impulse generator for the digit tubes "2" to "9" and the delay tube, and hence it will fire the "9" tube, which, as explained, is primed then through terminal 374, causing but one cycle of the impulse generator, which is all that is wanted in adding or subtracting operations. After the "9" tube of the units order of the tally impulse unit (Fig. 4) is fired, the calculation is ended.

The transfer impulse from the units bank of the tally impulse generator, to be described, when received at terminal 371 and impressed through capacitor 370, fires a key release tube 2400, if it be primed because of conduction in tube 1920, which actuates all the key release solenoids of the tally unit and the impulse generator unit, restoring the keys and temporarily opening an anode supply switch 436 serving all the tubes.

*Tally unit recycling impulse generator*

Figs. 1, 2, 3, and 4 show the circuits constituting the tally unit impulse generator for issuing recycling impulses to the impulse generator of Figs. 5, 6, 7, 8, 9, and 10 and for stepping the control unit of Fig. 13.

From what has been said before, it will be understood that the impulse generator of Figs. 5, 6, 7, 8, 9, and 10 is caused, in one cycle, to issue on each selected denomination output conductor a selected number of impulses, which impulses may be routed to the denominational banks of an accumulator. The tally unit impulse generator determines the number of cycles in each of selected stages of a calculating operation. In any addition and subtraction calculation, of course, there is only one cycle involved, and only one cycle is produced for such operations. In multiplying operations, up to four stages may be involved and up to nine cycles in each stage may be selected, this being the disclosed multiplier capacity. The tally unit impulse generator of Figs. 1, 2, 3, and 4 is controlled stage by stage by tubes 277, 278, 279, and 280 of Fig. 13, through terminals 375, 376, 373, and 377a (Figs. 1, 2, 3, and 4) to initiate the operation of the tally impulse generator banks, one at a time in multiplying operations. In addition or subtraction operations, tube 263 of Fig. 13 primes the "9" tube of the units bank of Fig. 4 through terminal 374. The firing of one of the tubes 277, 278, 279, and 280 of Fig. 13 commences the operation of the associated bank of the tally impulse generator or causes it to be by-passed in the event no keys are operated therein.

In a complete multiplying operation wherein one or more of the four denominational banks of the tally unit generator are used, the thousands bank (Fig. 1) functions first, followed by the hundreds bank (Fig. 2), the tens bank (Fig. 3), and the units bank (Fig. 4). In multiplying operations wherein a bank of the tally unit of lower denomination than the highest bank in which a key is operated has no key operated, that bank is by-passed on initiation of operation therein and issues no recycling impulses. As has been explained before, the tally unit impulse generator banks higher than the highest bank in which a key has been operated do not receive any initiating impulse and therefore do not function.

Operation of a key in the tally unit sets up certain conditions. For instance, the operation of the "1" key (Fig. 1) in the thousands bank causes movement of detent bar 301 (see also Fig. 13), preparing circuits resulting in the priming of tube 2050 (Fig. 13) when the start key 260 is operated. Referring again to Fig. 1, there are provided nine digit-representing gaseous triode electron tubes associated with respectively numbered keys. There are also provided a "delay" tube and a "by-pass" tube, the delay tube firing after the last digit key is depressed. In case no digit tube fires, the "by-pass" tube will fire immediately on initiation of operation of the bank.

The digit tubes receive anode potential from conductor 389, connected through resistor 390 of 5,000 ohms, point 391, and resistor 392 of 3,000 ohms to a positive 85-volt source of potential. Point 391 is connected to ground through resistor 393 of 20,000 ohms in parallel with capacitor 394 of .01 microfarad.

The anodes of the "delay" and "by-pass" tubes receive potential through a 1,500-ohm resistor 419 from point 420 connected on one side to an 85-volt source 417a through 40,000-ohm resistor 418 and connected on the other side to ground by 20,000-ohm resistor 421 in parallel with .01-microfarad capacitor 422.

The control grid of each tube is connected to the 170-volt negative conductor 396 through resistors, for example consider the "1" tube, like resistor 408 of 50,000 ohms, resistor 409 of 500,000 ohms, and resistor 410 of 100,000 ohms.

The cathode of each digit tube, tube "1" again being taken as an example, is connected on one side to ground through a 25,000-ohm resistor, like resistor 395, and on the other side to negative 170-volt supply conductor 396 through a resistor, like resistor 397, of 75,000 ohms, and a switch like switch 398, a point like point 400 (as the "1" key has been considered operated), conductor 401, point 404, and resistor 402 of 100,000 ohms. In the event the "1" key is not operated, the switch 398 contacts the point 399 and from there is connected through point 403 and through a 100,000-ohm resistor 401a to the said negative supply conductor 396. The cathodes of the other digit tubes have similar connections to conductor 396. Conductor 401 is connected to any of the digit key lower switches when in operated position. The cathodes of the "delay" and "by-pass" tubes are grounded on one side through a 60,000-ohm resistor 423 in parallel with a .01-microfarad capacitor 424, and on the other side are connected to the negative 170-volt conductor 396 through resistor 425 of 400,000 ohms. The "1" tube will become conducting first if any key in the bank is operated, as the "1" tube grid thereby is connected at point 411, by conductor 412, through 40,000-ohm resistor 4120 with ground by the upper switch of any such operated key, relieving the normal controlling grid bias potential, so that tube "1" may be fired in response to a positive impulse of about 15 volts impressed on terminal 375. The ensuing rise in its cathode potential is impressed on the grid of the "delay" tube, as the "1" key is assumed operated, by way of conductor 401. If a key higher than "1" is operated, the rise in potential of the "1" cathode will be impressed on the grid of the "2" tube through switch 398 and contact 399. The grid of the "delay" tube is biased so that a cathode potential rise caused by the last selected digit tube conducting, which rise is transferred to it over conductor 401, will cause said "delay" tube to fire and become conducting on receipt of a positive impulse on its grid.

Therefore, in the event of a digit tube firing, the cathode rise in potential is transferred to the grid of the next higher selected digit tube to prime it or to the "delay" tube, to fire it. Any digit tube so primed will fire in response to an input impulse. If no key in a bank is operated, all the digit tubes and the "delay" tube having a normal controlling bias applied to their grids will be held from firing. Considering digit tube "2" as typical of tubes "2," "3," "4," "5," "6," "7," "8," "9," and "delay," its grid is connected to point 403, which is normally at about 80 volts negative. The grid of the "1" digit tube is normally connected directly to the negative 170-volt conductor through resistor 408 of 50,000 ohms, resistor 409 of 500,000 ohms, and resistor 410 of 40,000 ohms. The grid of the "by-pass" tube has a normal potential that is controlling but which, being only about 48 volts negative with respect to ground or 27 volts negative with respect to the 21-volt negative cathode, loses control when a positive input impulse is received on input terminal 375. Point 428, normally connected to ground on one side through 40,000-ohm resistor 4281 and to the 170-volt negative conductor through resistor 4321 of 100,000 ohms on the other side, is disconnected from ground when a key of the bank is operated, and the grid of the "by-pass" tube receives the full 170-volt negative potential through said resistor 4321 of 100,000 ohms.

Thus, if a key is operated, the operation of the digit tubes of a bank of the tally unit impulse generator always begins with the "1" tube, no matter what digit key is depressed, and continues with the digit tubes in order until the tube associated with the operated key fires, and thereafter the "delay" tube fires. The grids of the digit tubes "2", "3," "4," "5," "6," "7," "8," and "9" and the "delay" tube are coupled to input conductor 414, each through a capacitor like capacitor 415 of .0001 microfarad. After initiation of the operation of a bank by the firing of the "1" tube by a positive impulse on terminal 375, then a positive impulse on terminal 188 (see also Fig. 11) will fire and render conducting the "2" tube in case a key higher than the "1" key has been operated, or the "delay" tube in the event only the "1" key has been operated. The operation of any key causes the switching of the cathode rise of its associated digit tube to the grid of the "delay" tube.

The cathode of each digit tube of a bank is coupled by a capacitor of .002 microfarad, like capacitor 416, to a common output conductor like conductor 417, grounded through a 100,000-ohm resistor like resistor 427. The thousands tally output terminal 253 (see also Fig. 12) is given a positive potential rise by the firing of an associated digit tube, causing relay tube 238 (Fig. 12) to become conducting, which initiates a recycling of the impulse generator, as has been described. Thus, the impulse generator of Figs. 5 to 10 is recycled a number of times by a bank of the tally unit impulse generator determined by the value of the key operated in that bank. The circuits of Fig. 13, as has been disclosed, may be used to determine into what denominations of the accumulator the produced impulses are to be entered. For example, in stage IV of a multiplication operation, the thousands bank of the tally unit (Fig. 1) as controlled by the firing of tube 277 (Fig. 13) controls the number of recyclings of the impulse generator (Figs. 5 to 10), and the priming of stage IV terminal 2260 (Fig. 13) as controlled by the previous firing of tube 2050 (Fig. 13) may determine the distribution of the impulses to an accumulator.

Grid point 430 of the "delay" tube (Fig. 1) is connected by capacitor 431 of .0001 microfarad to terminal 188 so as to be fired by the next impulse received on the termnal 188 from tube 153 (Fig. 11). The firing of the "delay" tube does not recycle the impulse generator, as its output is to terminal 371 (see also Fig. 13), which brings the next stage of the calculating operation into operating condition. If no key of the thousands bank (Fig. 1) is operated, the "by-pass" tube is primed and the "1" tube is unprimed and instead of the "1" tube firing, the "by-pass" tube fires on receipt of an impulse on terminal 375, its grid being coupled at point 432 and through capacitor 433 to input terminal 375, and, as it fires, it will impress an impulse on terminal 371, shifting the operation to the next stage. It will be obvious that the "by-pass" tube has no useful function in the thousands bank shown in Fig. 1 of the embodiment, as terminal 375 never receives an impulse if a key in the thousands bank is not operated. The "by-pass" tube is shown in Fig. 1 only to indicate that the tally unit banks, by being uniform, may be expanded to more than four stages.

The keys of the tally impulse unit are restored in the same manner as was disclosed in connection with the impulse generator; namely, by the firing of key release tube 2400 (Fig. 13).

Each time an impulse is received on terminal 371 (Fig. 13), which impulse is produced by the units bank of the tally unit impulse generator, the tube 2400 is fired as it is primed by reason of conduction in tube 1920.

Operation

As has been said, an adding or subtracting operation is accomplished by a single operation of the impulse generator performed in response to the impulse produced by the firing of the "9" tube in the units bank of the tally impulse producing unit (Fig. 4). If, for instance, the number "1087" is to be added, the following acts are performed—the "1" key in the thousands bank of the impulse generator (Fig. 8), the "8" key in the tens bank of the impulse generator (Fig. 6), and the "7" key in the units bank of the impulse generator (Fig. 5) are operated. The "add" key 225 (Fig. 12) is operated to condition tube 202. The switches 52 and 174 (Fig. 11) are closed. The add-subtract and multiplying key 290 (Fig. 13) is set in the position shown, and finally the "start" key 260 (Fig. 13) is operated. As the "start" key is operated, the tubes 263 and 343 fire, tube 263 priming stage I tube 1920 (Fig. 13) and the "9" tube in the units bank of the tally unit impulse generator (Fig. 4). The start tube 342 (Fig. 13) then fires and issues an impulse to fire stage I tube 1920, which primes relay tube 150 (Fig. 11) and fires tube 280 (Fig. 13). The impulse issuing from tube 280 fires the "9" tube (Fig. 4), which issues an output impulse firing tube 233 (Fig. 12), which fires tube 202 to issue an impulse to the input conductor to the hundred thousands bank of the impulse generator (Fig. 10). As no keys were operated in the hundred thousands bank, the "delay" tube and the T tube fire in succession, the firing of the T tube sending an impulse to the ten thousands bank of the impulse generator (Fig. 9), in which no keys were operated, causing the "delay" tube and the T tube therein to fire in succession, the impulse generated by the T tube being sent to the thousands bank of the impulse generator (Fig. 8), in which the "1" key was operated. The "1" tube in the said thousands bank fires, sending an impulse on the associated output conductor. After the "1" tube in the thousands bank of the impulse generator (Fig. 8) has fired, the "delay" tube and the T tube will be fired in succession, the latter tube sending an impulse to the hundreds bank of the impulse generator (Fig. 7), in which no key has been operated, firing the "delay" tube and the T tube therein. The impulse generated by the T tube of the hundreds bank starts operation of the tens bank of the impulse generator (Fig. 6), in which the "8" key has been operated. The "1," "2," "3," "4," "5," "6," "7," and "8" tubes will fire in succession, impressing eight impulses on output terminal 109. The "delay" tube and the T tube (Fig. 6) will then fire in succession, the T tube sending an impulse to start the operation of the units bank of the impulse generator (Fig. 5), which has had the "7" key operated. The "1," "2," "3," "4," "5," "6," and "7" tubes therein will fire in succession, impressing seven impulses on terminal 108. The "delay" tube and the T tube of the units bank of the impulse generator then fire in succession, the firing of the T tube generating an impulse impressed on terminal 115 (see also Fig. 11), firing tubes 116, 122, and 123 (Fig. 11) in succession. Tube 116 extinguishes the T tube of the tens bank of the impulse generator (Fig. 6), and tube 123 extinguishes the T tube of the units bank of the impulse generator (Fig. 5) and impresses an impulse on conductor 134 (Fig. 11), which fires the primed tube 150, generating an impulse on terminal 185 (see also Fig. 4), which fires the "delay" tube therein, generating an impulse on terminal 371 (see also Fig. 13), which fires the primed key release tube 2400, restoring the keys and momentarily interrupting the power supply by opening switch 436. The number 1087 has been produced as a pattern of impulses on the associated output conductors of the impulse generator.

Figure 2:
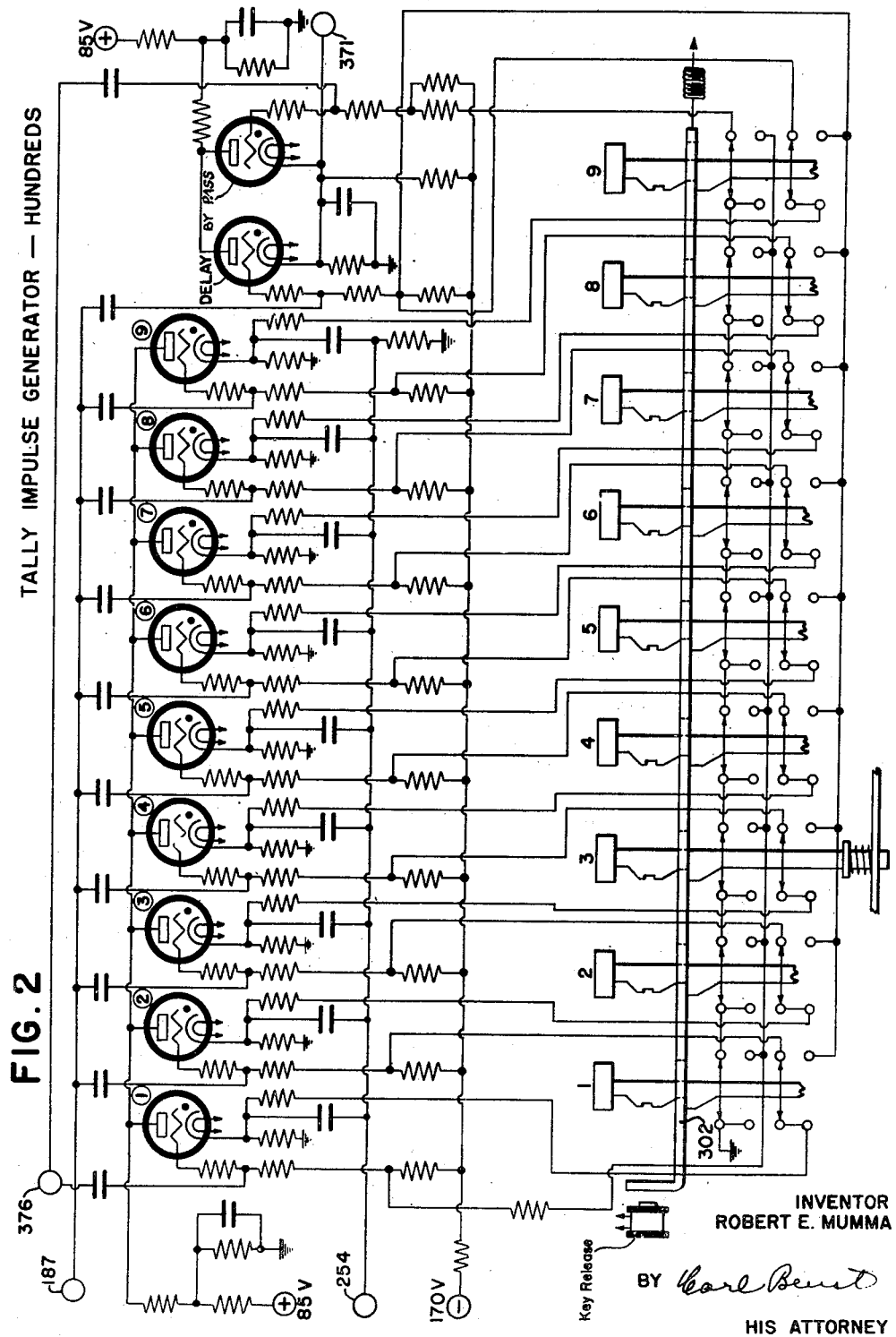
Figure 3:
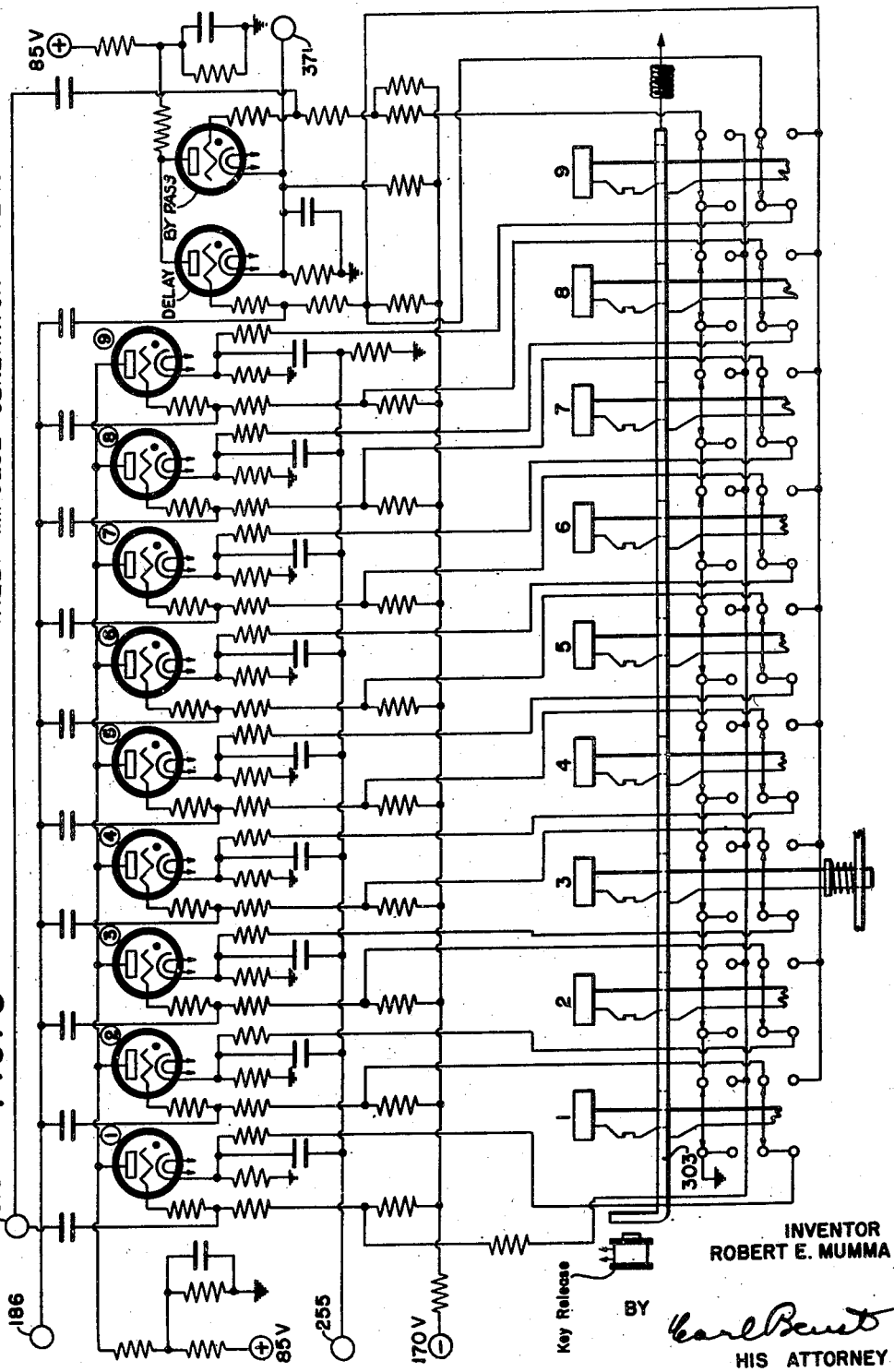

If the considered number 1087 is to be multiplied by another number such as 347, for example, the following operations are performed. The "3" key (Fig. 2), the "4" key (Fig. 3), and the "7" key (Fig. 4) in the tally impulse generator are operated. The same digit keys are operated in the impulse generator unit as were described in connection with the explanation of an adding operation. The "add" and "subtract" keys of Fig. 12 are left in the position shown. Switches 52 and 174 (Fig. 11) are closed, the key 290 (Fig. 13) is set to multiplying position, and start key 260 is operated. Tubes 263, 343, and 342 fire as in an adding operation. The firing of tube 263 primes stage III tube 2060, and the firing of tube 342 fires tube 2060, which in turn acts to fire tube 278, which in turn fires the "1" tube in the hundreds bank of the tally unit impulse generator (Fig. 2). When the "1" tube (Fig. 2) fired, an impulse was generated and impressed on terminal 254 (see also Fig. 12) to fire stage III tube 231 (Fig. 12), which creates an impulse on conductor 234, which fires tube 200, creating an impulse at terminal 84 (see also Fig. 8) to commence an operation of the thousands bank of the impulse generator. One impulse is produced at terminal 111. The hundreds bank of the impulse generator is by-passed. Next, eight impulses are impressed on terminal 109 (Fig. 7) by the firing of tubes "1," "2," "3," "4," "5," "6," "7," and "8" of the tens bank of the impulse generator (Fig. 6). The units bank of the impulse generator (Fig. 5) is actuated by the impulse produced by the T tube of Fig. 6, and the "1," "2," "3," "4," "5," "6," and "7" tubes therein fire in succession, creating seven impulses on terminal 108. The D and T tubes of the units bank of the impulse generator (Fig. 5) then fire, the T tube causing tubes 116, 122, and 123 (Fig. 11) to fire in succession, extinguishing conducting tubes of the impulse generator, thus preparing it for another cycle of operation and sending an impulse on conductor 134 which fires the primed relay tube 152, creating an impulse on terminal 187 (see also Fig. 2) which fires the "2" tube (Fig. 2), which has been primed by the conducting "1" tube. The impulse created by the firing "2" tube is impressed on terminal 254 (see also Fig. 12), which fires tube 231, which in turn fires tube 200 to create a recycling impulse on terminal 84, which starts another cycle of the impulse generator exactly as the one just described. At the conclusion of the second cycle of the impulse generator, the impulse on conductor 134 (Fig. 11) is relayed through tube 152, and the ensuing impulse on terminal 187 (see also Fig. 2) causes tube "3" (Fig. 2) to fire. The impulse generator is recycled again, making the third production pattern of the number 1087 in the stage III of the multiplying operation. The impulse created on conductor 134 (Fig. 11) and relayed to terminal 187 (see also Fig. 2) fires the "delay" tube (Fig. 2), creating an impulse on terminal 371 (see also Fig. 13), which fires the primed stage II tube 2070, which in turn fires tube 279. Tube 151 (Fig. 13) is now primed instead of tube 152. An impulse is produced on terminal 373 (Figs. 13 and 3), which starts operation of the tens bank of the tally unit impulse generator. Tubes "1," "2," "3," and "4" (Fig. 3) are fired in succession, tube "1" being fired by the impulse on terminal 373 and tubes "2," "3," and "4" being fired by impulses produced by tube 151 (Fig. 13) actuated once at the conclusion of each stage II cycle of the impulse generator. The number 1087 is therefore produced four times to complete the stage II of the multiplying operation. When the "delay" tube of Fig. 3 fires after the "4" tube, stage I of the multiplying operation is commenced by the firing of tubes 1920 and 280 (Fig. 13), the units bank of the tally unit causing the impulse generator to cycle seven times, which causes the number 1087 to be produced seven times as stage I. The firing of the "delay" tube of the units bank of the tally unit impulse generator fires the key release tube and completes the multiplying operation.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In combination, a plurality of denominational groups of digit-representing electron tubes; circuits connecting the tubes of a group in an operable sequence for automatically being rendered conducting sequentially; means connecting the groups so that they are automatically operated in sequence; selectively operable means for selecting a number of the tubes in each of selected groups to be operated in sequence in a cycle; means operable in response to the operation of the last group of the sequence for generating a control signal at the end of each cycle; and selectively operable means responsive to the control signals to initiate the operation of the tubes of the first group in the sequence in each of a selected number of cycles automatically in succession, said selectively operable means including devices presettable to control the number of cycles to be initiated.

2. In combination, a plurality of numerical denominational groups of electron tubes, there being a tube for each digit in a denomination; selectively operable circuits connecting the tubes of a group in an operative sequence so that, upon initiation of an operation of the group, a selected number of tubes will automatically be rendered conducting one at a time in succession; means connecting the groups in an operative sequence so that the last tube to operate in a group initiates the automatic sequential operation of the tubes in the next lower denominational group; and a selectively operable recycling means operable a selected number of times for automatically initiating the automatic sequential operation of the tubes in the highest denominational group after each completion of operation of the tubes in the lowest denominational group.

3. In combination, a plurality of numerical denominational groups of gaseous electron tubes, there being a tube for each digit in a denomination; selectively operable circuits connecting the tubes of a group so that, upon initiation of an operation of the group, a selected number of tubes will automatically be rendered conducting one at a time in succession; means connecting the groups in an operative sequence so that, on conclusion of operation of a group, the operation of the next lower denominational group in the sequence in which tubes have been selected for operation will be initiated; and a selectively operable recycling means for automatically initiating the operation of the first group of the sequence a selected number of times each initiation of a cycle depending on the conclusion of the preceding cycle.

4. An electronic multi-denominational electric impulse producer including denominational groups of digit-representing electron tubes operable by becoming conducting automatically one at a time in sequence in selected numbers in and by selected groups after initiation of operation in the first selected group; means controlled by the last sequential group and operated at the conclusion of operation of the last group; and a recycling control means operable under control of said concluding means and operated a selected number of times to initiate the automatic sequential operation of the tubes in the first group of the sequence, each operation of the recycling means being caused by operation of the concluding means and initiating an operation of the impulse producer.

5. In combination, a plurality of electric impulse output conductors, each representing a denominational order of a numerical system; an electronic unit for each digit of each denomination represented by the output conductors; means connecting the digit units in groups to the associated denominational output conductor so that operation of a unit causes an electric impulse in said associated conductor; means connecting the units of a denominational order so that selected numbers of units among them may be operated automatically one at a time in sequence; means to cause the denominational groups to be operated in sequence upon initiation of operation in the first denomination of the group sequence in which a unit has been selected; and selectively operable recycling means operated in response to the last denomination of the group sequence, upon termination of an operation thereof, and operable to initiate an operation of the first denomination in the group sequence in which a unit has been selected, said recycling means including controls for controlling the number of times it will operate to initiate the operation of the first denomination in the group sequence.

6. A first plurality of electron tubes arranged in an operative sequence including energy supply means and inter-tube connections so that conduction occurring in the beginning tube of the sequence causes the tubes to become conducting one at a time in sequence automatically; a second plurality of electron tubes arranged in an operative sequence including energy supply means and inter-tube connections so that the condition of conduction in a tube renders the next tube in the sequence ready to become conducting; an electron tube which is connected to energy sources and to the first plurality of tubes so that it becomes conducting at the conclusion of a sequential operation of said first plurality of tubes, and is connected to the tubes of the second plurality, so that the act of conduction occurring in said electron tube can cause the ready tube of the second plurality of tubes to become conducting; and connections between all the tubes of the second plurality and the beginning tube of the first plurality so that conduction commencing in any tube of the second plurality causes the beginning tube of the first plurality to become conducting.

7. A first plurality of electron tubes arranged in an operative sequence including energy supply means and inter-tube connections so that conduction occurring in the beginning tube of the sequence causes the tubes to become conducting one at a time in sequence automatically; an end of cycle tube supplied with energy and connectable to any electron tube of the first plurality so that conduction in the so connected tube of the first plurality renders the end of cycle tube conducting; selective means to interrupt the inter-tube connections of the first plurality with a selected tube and connect it to the end of cycle tube; a second plurality of electron tubes arranged in an operative sequence including energy supply means and inter-tube connections so that the condition of conduction in a tube renders the next tube in the sequence ready to become conducting; connections between the second plurality of tubes and the end of cycle tube so that conduction in the end of cycle tube causes conduction to commence in the ready tube of the second plurality; connections between all the tubes of the second plurality and the beginning tube of the first plurality which causes a sequential cycle of the first plurality when any tube of the second plurality becomes conducting; and selectively operable means to break the inter-tube connections of the second plurality of tubes at any selected point to determine the number of cycles said first plurality shall operate.

8. A first plurality of electron tubes arranged in an operative sequence including energy supply means and inter-tube connections so that conduction occurring in the beginning tube of the sequence causes the tubes to become conducting one at a time in sequence automatically; an end of cycle tube supplied with energy and connectable to any electron tube of the first plurality so that conduction in the so connected tube of the first plurality renders the end of cycle tube conducting; selective means to interrupt the inter-tube connections of the first plurality with a selected tube and connect it to the end of cycle tube; a second plurality of electron tubes arranged in an operative sequence including energy supply means and inter-tube connections so that the condition of conduction in a tube renders the next tube in the sequence ready to become conducting; connections between all the second plurality of tubes and the end of cycle tube so that conduction in the end of cycle tube causes conduction to commence in the ready tube of the second plurality; connections between all tubes of the second plurality and the beginning tube of the first plurality which causes a sequential cycle of the first plurality when any tube of the second plurality becomes conducting; and means to break the inter-tube connections of the second plurality of tubes at any selected point to determine the number of cycles said first plurality shall operate.

9. A first plurality of electron tubes arranged in an operative sequence including energy supply means and inter-tube connections so that conduction occurring in the beginning tube of the sequence causes the tubes to become conducting one at a time in sequence automatically; an end of cycle tube supplied with energy and connectable to any electron tube of the first plurality so that conduction in the so connected tube of the first plurality renders the end of cycle tube conducting; selective means to interrupt the inter-tube connections of the first plurality with a selected tube and connect it to the end of cycle tube; a second plurality of electron tubes arranged in an operative sequence including energy supply means and inter-tube connections so that the condition of conduction in a tube renders the next tube in the sequence ready to become conducting; connections between all the second plurality of tubes and the end of cycle tube so that conduction in the end of cycle tube causes conduction to commence in the ready tube of the second plurality; connections between all the tubes of the second plurality and the beginning tube of the first plurality which causes a sequential cycle of the first plurality when any tube of the second plurality becomes conducting; means to break the inter-tube connections of the second plurality of tubes at any selected point to determine the number of cycles said first plurality shall operate; and an output conductor connected to all the tubes of the first plurality which receives an electric impulse as any tube of the plurality is rendered conducting.

10. A first plurality of electronic units arranged in an operative sequence including energy supply means and inter-unit connections so that conduction occurring in a particular unit causes the next unit of the sequence to become conducting automatically, which act of conduction extinguishes the conduction in the preceding unit of the sequence; a second plurality of electronic units arranged in an operative sequence including energy supply means and inter-unit connections, so that conduction occurring in a particular unit causes the next unit of the sequence to be prepared for conduction in the event of which conduction the said particular unit is extinguished; an end electronic unit which is connected to energy sources and to the first plurality of units so as to become conducting at the conclusion of a sequential operation of said first plurality of units; means connecting the end unit and the second plurality of units so that conduction in the end unit causes the prepared unit in the second plurality to conduct; and connections between the units of the second plurality and a unit of the first plurality so that conduction in any unit of the second plurality causes the connected unit of the first plurality to become conducting.

11. A first plurality of electronic units arranged in an operative sequence including energy supply means and inter-unit connections so that conduction occurring in a particular unit causes the next succeeding unit of the sequence to become conducting automatically, which act of conduction extinguishes conduction in the preceding unit of the sequence; a second plurality of electronic units arranged in an operative sequence including energy supply means and inter-unit connections, so that conduction occurring in a particular unit caused the succeeding unit to be prepared for conduction, in the event of which conduction the preceding preparing unit is extinguished; an end electronic unit which is connected to energy sources and to the first plurality of units so as to become conducting at the conclusion of a sequential operation of said first plurality of units; means connecting the end unit and the second plurality of units so that conduction in the end unit causes the ready unit in the second plurality of units to conduct; and means to select a certain number of first units to compose the sequence.

12. A first plurality of electronic units arranged in an operative sequence including energy supply means and inter-unit connections so that conduction occurring in a particular unit causes the next succeeding unit of the sequence to become conducting automatically, which act of conduction extinguishes conduction in the preceding unit of the sequence; a second plurality of electronic units arranged in an operative sequence including energy supply means and inter-unit connections, so that conduction occurring in a particular unit causes the succeeding unit to be prepared for conduction, in the event of which conduction the preceding preparing unit is extinguished; an end electronic unit which is connected to energy sources and to the first plurality of units so as to become conducting at the conclusion of a sequential operation of said first plurality of units; means connecting the end unit and the second plurality of units so that conduction in the end unit causes the ready unit in the second plurality of units to conduct; and means to select a certain number of second units to compose the sequence.

13. A first plurality of electronic units arranged in an operative sequence including energy supply means and inter-unit connections so that conduction occurring in a particular unit causes the next succeeding unit of the sequence to become conducting automatically, which act of conduction extinguishes conduction in the preceding unit of the sequence; a second plurality of electronic units arranged in an operative sequence including energy supply means and inter-unit connections, so that conduction occurring in a particular unit causes the succeeding unit to be prepared for conduction, in the event of which conduction the preceding preparing unit is extinguished; an end electronic unit which is connected to energy sources and to the first plurality of units so as to become conducting at the conclusion of a sequential operation of said first plurality of units; means connecting the end unit and the second plurality of units so that conduction in the end unit causes the ready unit in the second plurality of units to conduct; and means to select a certain number of first units and a certain number of second units to compose their respective operative sequences.

14. A first plurality of electronic units arranged in an operative sequence including energy supply means and inter-unit connections so that conduction occurring in a particular unit causes the next succeeding unit of the sequence to become conducting automatically, which act of conduction extinguishes conduction in the preceding unit of the sequence; a second plurality of electronic units arranged in an operative sequence including energy supply means and inter-unit connections, so that conduction occurring in a particular unit causes the succeeding unit to be prepared for conduction, in the event of which conduction the preceding preparing unit is extinguished; an end electronic unit which is connected to energy sources and to the first plurality of units so as to become conducting at the conclusion of a sequential operation of said first plurality of units; means connecting the end unit and the second plurality of units so that conduction in the end unit causes the ready unit in the second plurality of units to conduct; means to select a certain number of first units to compose the sequence; and means to render a unit of the second plurality conducting to commence an operation.

15. A plurality of groups of electron tubes, each group having a number of tubes equal in number to the digits in a numerical denomination; means including energy supply circuits and inter-tube connections for forming a selected number of digit tubes in each group into an operative sequence having a beginning tube, so that conduction commencing in a preceding tube of a sequence causes the next succeeding tube of the sequence to become conducting automatically, which act of conduction causes the preceding tube to become non-conducting; an end tube for each group connected with the energy supply circuits of the groups and connected to the associated group and to the digit tubes of the succeeding group, if any, so that, upon conduction commencing in the last selected tube of a group, the associated end tube is caused to conduct and render the last tube non-conducting and to cause the beginning tube of the next group of the sequence to conduct, which act of conduction renders the said end tube of the preceding group non-conducting; a second plurality of groups of electron tubes, each group having a tube for each digit in a numerical denomination; circuits supplying operating energy to said tubes of the second plurality; inter-tube connections between the tubes of each second group forming them into an operative sequence so that conduction in a tube makes the succeeding tube in the sequence ready for conduction, which act of conduction extinguishes the preceding conducting tube; means to select a number of digit tubes in each of selected ones of the second plurality of groups to form the operative sequence for the associated group, said selecting means making ready the beginning tube of the beginning group of the second groups; and control means coupling the groups of the second plurality of groups into an operative sequence so that the second plurality of groups will be operated in sequence a step at a time starting with the beginning group, each step being in response to the conduction in the end tube of the last group of the first plurality of groups.

16. A plurality of groups of electron tubes, each group having a number of tubes equal in number to the digits in a numerical denomination; means including energy supply circuits and inter-tube connections for forming a selected number of digit tubes in each group into an operative sequence having a beginning tube, so that conduction commencing in a preceding tube of a sequence causes the next succeeding tube of the sequence to become conducting automatically, which act of conduction causes the preceding tube to become non-conducting; an end tube for each group connected with the energy supply circuits of the groups and connected to the associated group and to the digit tubes of the succeeding group, if any, so that, upon conduction commencing in the last selected tube of a group, the associated end tube is caused to conduct and render the last tube non-conducting and to cause the beginning tube of the next group of the sequence to conduct, which act of conduction renders the said end tube of the preceding group non-conducting; a second plurality of groups of electron tubes, each group having a tube for each digit in a numerical denomination; circuits supplying operating energy to said tubes of the second plurality; inter-tube connections between the tubes of each second group forming them into an operative sequence so that conduction in a tube makes the succeeding tube in the sequence ready for conduction, which act of conduction extinguishes the preceding conducting tube; means to select a number of digit tubes in each of selected ones of the second plurality of groups to form the operative sequence for the associated group, said selecting means making ready the beginning tube of the beginning group of the second groups; control means coupling the groups of the second plurality of groups into an operative sequence so that the second plurality of groups will be operated in sequence a step at a time starting with the beginning group, each step being in response to the conduction in the end tube of the last group of the first plurality of groups; and means to render the end tube of the last group of the first plurality of groups non-conducting after each complete operation of the first groups and before a subsequent operation thereof.

17. A plurality of groups of electronic units, each group having a number of units equal to the number of digits in a numerical denomination; means including energy supply circuits and inter-unit connections for forming an operative sequence in each group commencing with a beginning unit so that conduction occurring in a preceding unit causes the next succeeding unit of the sequence to become conducting automatically, which act of conduction extinguishes the preceding unit; an end electronic unit for each group, which is connected to energy sources and to the associated group so that the act of conduction occurring in the last unit of a group causes the end unit to conduct; means connecting the groups of units in a sequence by connecting the end unit of one group to a succeeding group so that the conduction in an end unit will cause the unit beginning the sequence of the next group to conduct; starting means to cause the beginning unit of the first group of the sequence to conduct; means to select a certain number of units in each group to comprise the operative sequence of that group; and means actuated by conduction in the end unit of the last group to create an electric impulse to cause the starting means to function again to cause the beginning unit of the first group to conduct again.

18. A plurality of groups of electronic units, each group having a number of units equal to the number of digits in a numerical denomination; means including energy supply circuits and inter-unit connections for forming an operative sequence in each group commencing with a beginning unit so that conduction occurring in a preceding unit causes the next succeeding unit of the sequence to become conducting automatically, which act of conduction extinguishes the preceding unit; an end electronic unit for each group, which is connected to energy sources and to the associated group so that the act of conduction occurring in the last unit of a group causes the end unit to conduct; means connecting the groups of units in a sequence by connecting the end unit of one group to a succeeding group so that the conduction in an end unit will cause the unit beginning the sequence of the next group to conduct; selectively operable starting means to cause the beginning unit of the first group of the sequence to become conducting, which starting means may be caused to start the conduction in the first unit of the first group an exact selected number of times, each starting action except the first being caused by conduction in the end unit of the last group of the sequence; and means to cause the starting means to cause the beginning tube of the first unit to conduct to commence the first operation of the first group.

19. A plurality of groups of electron tubes, each group having a number of tubes equal in number to the digits in a numerical denomination; means including energy supply circuits and inter-tube connections for forming a selected number of digit tubes in each group into an operative sequence having a beginning tube, so that conduction commencing in a preceding tube of a sequence causes the next succeeding tube of the sequence to become conducting automatically, which act of conduction in the succeeding tube causes the preceding tube to become non-conducting; an end tube for each group connected with the energy supply circuits of the groups and connected to the associated group and to the digit tubes of the succeeding group, if any, so that, upon conduction commencing in the last selected tube of a group, the associated end tube is caused to conduct and render the last tube non-conducting and to cause the beginning tube of the next group of the sequence to conduct, which renders the said end tube of the preceding tube non-conducting; and means actuated by the end tube of the last group to start conduction in the beginning tube of the first group, which act in turn causes also the end tube of the last group to become non-conducting.

20. A first plurality of electron tubes arranged in an operative sequence including energy supply means and inter-tube connections so that conduction occurring in the beginning tube of the sequence causes the tubes to become conducting one at a time in sequence automatically; a second plurality of electron tubes arranged in an operative sequence including energy supply means and inter-tube connections so that conduction occurring in the beginning tube of the sequence causes the tubes to become conducting one at a time in sequence automatically; an end tube supplied with energy and connectable to any electron tube of the first plurality so that conduction in the so connected tube of the first plurality renders the end tube conducting; selective means to interrupt the inter-tube connections of the first plurality with a selected tube and connect it to the end tube; and means connecting the end tube to the second plurality of tubes to initiate an operation therein whenever the end tube is rendered conducting.

21. A plurality of groups of electronic units, each group having a number of units equal to the number of digits in a numerical denomination; means including energy supply circuits and inter-unit connections for forming an operative sequence in each group commencing with a beginning unit so that conduction occurring in a preceding unit causes the next succeeding unit of the sequence to become conducting automatically, which act extinguishes the preceding unit; an end electronic unit for each group, which is connected to energy sources and to the associated group; means selecting the number of units to be operated in each of the plurality of groups; means connecting the last selected unit of a group to its related end unit so that the act of conduction occurring in the last selected unit of a group causes the end unit to conduit; and means connecting the groups of units in a sequence by connecting the end unit of one group to a succeeding group so that the conduction in an end unit will cause the unit beginning the sequence of the next group to conduct.

22. A plurality of groups of electronic units, each group having a number of units equal to the number of digits in a numerical denomination; means including energy supply circuits and inter-unit connections for forming an operative sequence in each group commencing with a beginning unit so that conduction occurring in a preceding unit causes the next succeeding unit of the sequence to become conducting automatically, which act extinguishes the preceding unit; an end electronic unit for each group, which is connected to energy sources and to the associated group; means to select a certain number of units in each group to comprise the operative sequence of that group and to connect the end unit of each group to the last selected unit in that group so that the act of conduction occurring in the last selected unit of a group causes the end unit to conduit; means connecting the groups of units in a sequence by connecting the end unit of one group to a succeeding group so that the conduction in an end unit will cause the unit beginning the sequence of the next group to conduct; and starting means to cause the beginning unit of the first group of the sequence to conduit.

23. A plurality of groups of electron tubes, each group having a number of tubes equal in number to the digits in a numerical denomination; means including energy supply circuits and inter-tube connections for forming a selected number of digit tubes in each group into an operative sequence having a beginning tube so that conduction commencing in a preceding tube of a sequence causes the next succeeding tube of the sequence to become conducting automatically, which act of conduction in the succeeding tube causes the preceding tube to become non-conducting; and an end tube for each group connected with the energy supply circuits of the groups and connected to the associated group and to the digit tubes of the succeeding group, if any, so that, upon conduction commencing in the last selected tube of a group, the associated end tube is caused to conduct and render the last tube non-conducting and to cause the beginning tube of the next group of the sequence to conduct, which renders the said end tube of the preceding group non-conducting.

24. A plurality of groups of electron tubes, each group having a number of tubes equal in number to the digits in a numerical denomination; means including energy supply circuits and inter-tube connections for forming a selected number of digit tubes in each group into an operative sequence having a beginning tube, so that conduction commencing in a preceding tube of a sequence causes the next succeeding tube of the sequence to become conducting automatically, which act of conduction in the succeeding tube causes the preceding tube to become non-conducting; an end tube for each group connected with the energy supply circuits of the groups and connected to the associated group and to the digit tubes of the succeeding group, if any, so that, upon conduction commencing in the last selected tube of a group, the associated end tube is caused to conduct and render the last tube non-conducting and to cause the beginning tube of the next group of the sequence to conduct, which renders the said end tube of the preceding group non-conducting; and an output conductor for each group which is given an electric impulse as each associated selected tube becomes conducting.

25. A plurality of gas discharge electron tubes each having at least an anode, a cathode, and a control element; means to supply anode-cathode potential to said tubes, said anode potential supply means having a common resistance for all the tubes and the cathode potential supply means having an individual resistance for each tube; means interconnecting the tubes in an operative sequential chain from cathode to control element; a common input conductor to which all the control elements, except that of the beginning tube of the chain, are electrostatically coupled; control element bias potential supply means normally controlling the discharge in a tube but being caused to lose control when a tube receives a positive electric impulse on the input conductor at a time when the preceding tube of the sequence is conducting; means connecting each of the cathodes electrostatically to a common output conductor which is connected to a source of potential through a resistance, whereby, on each tube firing in response to an impulse in the input conductor, the output conductor receives an impulse and the preceding tube is extinguished; input means electrostatically coupled to the control element of the beginning tube; and selective means operable to break the inter-tube connections at any point in the sequence and to prepare the beginning tube for conduction so as to be responsive to a discharge provoking impulse on its input means.

26. A plurality of gas discharge electron tubes each having at least an anode, a cathode, and a control element; means to supply anode-cathode potential to said tubes, said anode potential supply means having a common resistance for all the tubes and the cathode potential supply means having an individual resistance for each tube; means interconnecting the tubes in an operative sequential chain from cathode to control element; a common input conductor to which all the control elements, except that of the beginning tube of the chain, are electrostatically coupled; an input conductor coupled to the control element of the beginning tube; control element bias potential supply means normally controlling the discharge in a tube but being caused to lose control when a tube receives a positive electric impulse on the input conductor at a time when the preceding tube of the sequence is conducting or in the case of the beginning tube when its potential bias is relieved to near the firing point; and means connecting each of the cathodes electrostatically to a common output conductor which is connected to a source of potential through a resistance, whereby, on each tube firing in response to an impulse on the input conductor, the output conductor receives an impulse and the preceding tube is extinguished.

27. A plurality of gas discharge electron tubes each having at least an anode, a cathode, and a control element; means to supply anode-cathode potential to said tubes, said anode potential supply means having a common resistance for all the tubes and the cathode potential supply means having an individual resistance for each tube; means interconnecting the tubes in an operative sequential chain from cathode to control element; a common input conductor to which all the control elements, except that of the beginning tube of the chain, are electrostatically coupled; control element bias potential supply means normally controlling the discharge in a tube but being caused to lose control when a tube receives a positive electric impulse on the input conductor at a time when the preceding tube of the sequence is conducting; means connecting each of the cathodes electrostatically to a common output conductor which is connected to a source of potential through a resistance, whereby, on each tube firing in response to an impulse in the input conductor, the output conductor receives an impulse and the preceding tube is extinguished; selective means operable to break the inter-tube connections at any point in the sequence and to prepare the beginning tube for conduction so as to be responsive to a discharge provoking input impulse; and means to impress an effective discharge provoking impulse on the beginning tube's control element.

28. A plurality of gas discharge electron tubes each having at least an anode, a cathode, and a control element; means to supply anode-cathode potential to said tubes, said anode potential supply means having a common resistance for all the tubes and the cathode potential supply means having an individual resistance for each tube; means interconnecting the tubes in an operative sequential chain from cathode to control element; a common input conductor to which all the control elements, except that of the beginning tube of the chain, are electrostatically coupled; control element bias potential supply means normally controlling the discharge in a tube but being caused to lose control when a tube receives a positive electric impulse on the input conductor at a time when the preceding tube of the sequence is conducting; means connecting each of the cathodes electrostatically to a common output conductor which is connected to a source of potential through a resistance, whereby, on each tube firing, the output conductor receives an impulse and the preceding tube of the chain is extinguished; selective means operable to break the inter-tube connections at any point in the sequence; an extra gaseous electron discharge tube having at least an anode, a cathode, and a control element; means supplying anode-cathode potential to said extra tube; means for supplying normally controlling bias potential to the control member of the extra tube; means operative when the selecting means is not used to connect the control element of the extra tube to a source of potential to relieve the bias of the extra tube to almost the firing potential; common input means to which the beginning tube and the extra tube have their control members electrostatically coupled; and means to sever the connection of the control element of the extra tube to the source of relieving potential and to connect said source to the control element of the beginning tube whenever the selecting means is operated.

29. In combination, a plurality of electronic devices each having at least an anode, a cathode, and a control member; means coupling the tubes cathode to grid in an operative sequence chain; means coupling the cathodes of all but the last tube of the chain to a common output conductor; means coupling the control elements of the first and last tube of the sequence to a first input conductor, an electric impulse on which tends to render the associated tubes conducting; means coupling the control elements of all the tubes of the group except the first and last to a second input conductor, an electric impulse on which tends to render the associated tubes conducting; potential supply circuits for the anode-cathode and bias potential for the tubes including an individual resistor for each cathode whereby, conduction in any tube of the chain except the last causes an electric impulse on the output conductor; and means for breaking the cathode control element connection between any two tubes and connecting the said cathode to the control element of the last tube.

30. In combination, a plurality of electronic devices each having at least an anode, a cathode, and a control member; means coupling the tubes cathode to grid in an operative sequence chain; means coupling the cathodes of all but the last two tubes of the chain to a common output conductor; means coupling the control elements of the first and next to last tube of the sequence to a first input conductor, an electric impulse on which tends to render the associated tubes conducting; means coupling the control elements of the tubes of the group intermediate the first and next to last tubes to a second input conductor, an electric impulse on which tends to render the associated tubes conducting; potential supply circuits for the anode-cathode and bias potential for the tubes including an individual resistor for each cathode, whereby conduction in any tube of the chain except the last two causes an electric impulse on the output conductor; and means for selectively determining whether an electric impulse on the first input conductor shall cause conduction to commence in the first or the next to last tube.

31. In combination, a plurality of electronic devices each having at least an anode, a cathode, and a control member; means coupling the tubes cathode to grid in an operative sequence chain; means coupling the cathodes of all but the last two tubes of the chain to a common output conductor; means coupling the control elements of the first and next to last tube of the sequence to a first input conductor, an electric impulse on which tends to render the associated tubes conducting; means coupling the control elements of the tubes of the group intermediate the first and next to last tubes to a second input conductor, an electric impulse on which tends to render the associated tubes conducting; potential supply circuits for the anode-cathode and bias potential for the tubes including an individual resistor for each cathode, whereby conduction in any tube except the last two of the chain causes an electric impulse on the output conductor; means for selectively determining whether an electric impulse on the first input conductor shall cause conduction to commence in the first or next to last tube; and means for impressing an initiating electric impulse on said first input conductor.

32. In combination, a plurality of groups of gaseous discharge electron tubes each having at least an anode, a cathode, and a control element; common means for the tubes of each group for supplying anode-cathode potential thereto including a common anode resistor and individual cathode resistors; means connecting the cathodes of the tubes of a group electrostatically to an output conductor connected through resistance to a source of potential; means connecting the control elements of the tubes of a group to a source of normally controlling potential; means connecting the tubes in a group in an operative sequence cathode to control grid; means electrostatically coupling the control element of the beginning tube of a group to an input circuit, an impulse on which tends to render the tube conducting; means electrostatically connecting all the tubes in a group except the beginning tube to a common input conductor, an impulse on which renders a tube succeeding a conducting tube conducting; selectively operable means to interrupt the inter-tube connections between any two tubes of a group, said selectively operable means, when operated, also connecting the control element of the beginning tube to a source of bias relieving potential so that the beginning tube will become conducting on receiving a discharge-provoking input impulse on its input circuit; an extra gaseous discharge electron tube for each extra tube group, each having at least an anode, a cathode, and a control element; means to supply anode-cathode potential to each of said extra tubes, said means including a cathode resistor; means to supply bias potential to the control element of each of said extra tubes, which potential is controlling but is relieved from the bias-relieving potential source through the associated selectively operable means when said selectively operable means has not been operated; means electrostatically connecting the control element of the extra tube to the input circuit of the beginning tube; a relay electron tube for each group actuated by the electric potential impulses from the associated groups of tubes; and means connecting the output of each relay tube to a common terminal so that said terminal receives an electric impulse for each tube of any group that is rendered conducting.

33. In combination, a plurality of groups of gaseous discharge electron tubes each having at least an anode, a cathode, and a control element; common means for the tubes of each group for supplying anode-cathode potential thereto including a common anode resistor and individual cathode resistors; means connecting the cathodes of the tubes of a group electrostatically to an output conductor connected through a resistor to a source of potential; means connecting the control elements of the tubes of a group to a source of normally controlling potential; means connecting the tubes in a group in an operative sequence cathode to control grid; means electrostatically coupling the control element of the beginning tube of a group to an input circuit, an impulse on which tends to render that tube conducting; means electrostatically connecting all the tubes in a group except the beginning tube to a common input conductor, an impulse on which renders a succeeding tube to a conducting tube conducting; selectively operable means to interrupt the inter-tube connections between any two tubes of a group, said selectively operable means, when operated also connecting the control element of the beginning tube to a source of bias-relieving potential so that the beginning tube will become conducting on receiving a discharge-provoking input impulse on its input circuit; an extra gaseous discharge electron tube for each group, each extra tube having at least an anode, a cathode, and a control element; means to supply anode-cathode potential to each of said extra tubes, said means including a cathode resistor; means to supply bias potential to the control element of each of said extra tubes, which potential is controlling but is relieved from the bias-relieving potential source through the associated selectively operable means when said selectively operable means has not been operated; means electrostatically connecting the control element of the extra tube to the input circuit of the beginning tube; a relay electron tube for each group actuated by the electric potential impulses from the associated groups of tubes; means connecting the output of each relay tube to a common terminal so that said terminal receives an electric impulse for each tube of any group that is rendered conducting; and means to impress an electric impulse on the input circuit for the beginning tube and the extra tube of any group.

34. In combination, a plurality of groups of gaseous discharge electron tubes each having at least an anode, a cathode, and a control element; common means for the tubes of each group for supplying anode-cathode potential thereto including a common anode resistor and individual cathode resistors; means connecting the cathodes of the tubes of a group electrostatically to an output conductor connected through an impedance to a source of potential; means connecting the control elements of the tubes of a group to a source of normally controlling potential; means connecting the tubes in a group in an operative sequence cathode to control grid; means electrostatically coupling the control element of the beginning tube of a group to an input circuit, an impulse on which tends to render the tube conducting; means electrostatically connecting all the tubes in a group except the beginning tube to a common input conductor, an impulse on which renders a tube succeeding a conducting tube conducting; selectively operable means to interrupt the inter-tube connections between any two tubes of a group, said selectively operable means, when operated, also connecting the control element of the beginning tube to a source of bias-relieving potential so that the beginning tube will become conducting on receiving a discharge-provoking input impulse on its input circuit; an extra gaseous discharge electron tube for each group, each extra tube having at least an anode, a cathode, and a control element; means to supply anode-cathode potential to each of said extra tubes, said means including a cathode resistor; means to supply bias potential to the control element of each of said extra tubes, which potential is controlling but is relieved to near the firing point from the bias-relieving potential source obtained through the associated selectively operable means when said selectively operable means has not been operated; means electrostatically connecting the control element of the extra tube to the input circuit of the beginning tube, an impulse on the input circuit firing the extra tube if its bias is relieved; a relay electron tube for each group actuated by the electric potential impulses on the output conductor produced by the associated groups of tubes; means connecting the output of each relay tube to a common terminal so that said terminal receives an electric impulse for each output conductor associated tube of any group that is rendered conducting; a gaseous discharge electron tube provided for each group for delay purposes, each of said delay tubes having at least an anode, a cathode, and a control element and being supplied with anode-cathode potential from the same sources as the associated extra tube, and having a normally controlling bias potential applied to its control element; means connecting the control element of the delay tube to the cathode of the last selected tube of the output conductor associated group; and means connecting the control element of the delay tube to the input conductor serving the tubes following the beginning tube, whereby said delay tube is caused to conduct on receipt of an impulse at the conclusion of the sequential operation of the tubes of the associated group; however, if the selectively operable means has not been operated, the tubes of the groups and delay tubes will not operate but the extra tube will conduct on the receipt of an electric potential impulse on the input circuit of the beginning tube.

35. In combination, a plurality of output groups of gaseous discharge electron tubes each having at least an anode, a cathode, and a control element; common means for the tubes of each group for supplying anode-cathode potential thereto including a common anode resistor and individual cathode resistors; means connecting the cathodes of the tubes of a group electrostatically to an output conductor connected through a resistor to a source of potential; means connecting the control elements of the tubes of a group to a source of normally controlling potential; means connecting the tubes in a group in an operative sequence cathode to control grid; means electrostatically coupling the control element of the beginning tube of a group to an input circuit, an impulse on which tends to provoke a discharge in the tube; means electrostatically connecting all the tubes in a group except the beginning tube to a common input conductor, an impulse on which renders a tube succeeding a conducting tube conducting; selectively operable means to interrupt the inter-tube connections between any two tubes of a group, said selectively operable means, when operated, also connecting the control element of the beginning tube to a source of bias-relieving potential so that the beginning tube will become conducting on receiving a discharge-provoking input impulse on its input circuit; an extra gaseous discharge electron tube for each group, each extra tube having at least an anode, a cathode, and a control element; means to supply anode-cathode potential to each of said extra tubes, said means including a cathode resistor; means to supply bias potential to the control element of each of said extra tubes, which potential is controlling but is relieved from the bias-relieving potential source through the associated selectively operable means when said selectively operable means has not been operated; means electrostatically connecting the control element of the extra tube to the input circuit of the beginning tube, an impulse on said circuit firing the extra tube if its control potential is relieved; a relay electron tube for each group actuated by the electric potential impulses on the output conductor from the associated groups of tubes; means connecting the output of each relay tube to a common terminal so that said terminal receives an electric impulse for each output conductor associated tube of any group that is rendered conducting; a gaseous discharge electron tube provided for each group for delay purposes, each of said delay tubes having at least an anode, a cathode, and a control element and being supplied with anode-cathode potential from the same sources as the associated extra tube, and having a normally controlling bias potential applied to its control element; means connecting the control element of the delay tube to the cathode of the last selected tube of the associated group; means connecting the control element of the delay tube to the input conductor serving the tubes following the beginning tube, whereby said delay tube is caused to conduct on an impulse received at the conclusion of the sequential operation of the output tubes of the associated group; however, if the selectively operable means has not been operated, the group of tubes and delay tube will not be operated but only the extra tube will operate on the receipt of an electric potential impulse on the input circuit of the beginning tube; and circuit elements of resistance, capacitance, and distributed inductance in the potential supply circuits of the delay tube and the extra tube which causes them to become immediately extinguished after commencing to conduct.

36. In combination, a plurality of groups of output gaseous discharge electron tubes each having at least an anode, a cathode, and a control element; common means for the tubes of each group for supplying anode-cathode potential thereto including a common anode resistor and individual cathode resistors; means connecting the cathodes of the tubes of a group electrostatically to an output conductor connected over an impedance to a source of potential, said anode-cathode potential supply circuits having elements of resistance, and capacitance which causes any conducting tube to be immediately extinguished when another tube of the group is rendered conducting; means connecting the control elements of the tubes of a group to a source of controlling potential; means connecting the tubes in a group in an operative sequence chain cathode to control grid; means electrostatically coupling the control element of the beginning tube of a group to an input circuit; means electrostatically connecting all the tubes in a group except the beginning tube to a common input conductor; selectively operable means to interrupt the inter-tube connections between any two tubes of a group, said selectively operable means, when operated, also connecting the control element of the beginning tube to a source of bias-relieving potential so that the beginning tube will become conducting on receiving an input impulse on its input circuit; an extra gaseous discharge electron tube for each group, each extra tube having at least an anode, a cathode, and a control element; means to supply anode-cathode potential to each of said extra tubes, said means including a cathode resistor; means to supply bias potential to the control element of each of said extra tubes, which potential is controlling but is relieved from the bias-relieving potential source through the associated selectively operable means when said selectively operable means has not been operated; means electrostatically connecting the control element of the extra tube to the input circuit of the beginning tube; a relay electron tube for each group actuated by the electric potential impulses on the output conductor of associated output group of tubes; means connecting the output of each relay tube to a common terminal so that said terminal receives an electric impulse for each tube of any group that is rendered conducting; a gaseous discharge electron tube provided for each group for delay purposes, each of said delay tubes having at least an anode, a cathode, and a control element and being supplied with anode-cathode potential from the same source as the associated extra tube, and having a normally controlling bias potential applied to its control element; means connecting the control element of the delay tube to the cathode of the last selected tube of the associated group whereby said delay tube is caused to conduct at the conclusion of the sequential operation of the selected tubes of the associated group; however, if the selectively operable means has not been operated, the group and delay tube will not operate and the extra tube alone will conduct on the receipt of an electric potential impulse on the input circuit of the beginning tube; and means connecting the cathodes of the extra tubes and delay tubes to a common output terminal.

37. In combination, a plurality of groups of gaseous discharge electron tubes each having at least an anode, a cathode, and a control element; common means for the tubes of each group for supplying anode-cathode potential thereto including a common anode resistor and individual cathode resistors; means connecting the cathodes of the tubes of a group electrostatically to an output conductor connected over an impedance to a source of potential, said anode-cathode potential supply circuits having elements of resistance and capacitance which cause any conducting tube to be immediately extinguished when another tube of the group is rendered conducting; means connecting the control elements of the tubes of a group to a source of controlling potential; means connecting the tubes in a group in an operative sequence chain cathode to control grid; means electrostatically coupling the control element of the beginning tube of a group to an input circuit; means electrostatically connecting all the tubes in a group except the beginning tube to a common input conductor; selectively operable means to interrupt the inter-tube connections between any two tubes of a group, said selectively operable means, when operated, also connecting the control element of the beginning tube to a source of bias-relieving potential so that the beginning tube will become conducting on receiving an input impulse on its input circuit; an extra gaseous discharge electron tube for each group, each extra tube having at least an anode, a cathode, and a control element; means to supply anode-cathode potential to each of said extra tubes, said means including a cathode resistor; means to supply bias potential to the control element of each of said extra tubes, which potential is controlling but is relieved from the bias-relieving potential source through the associated selectively operable means when said selectively operable means has not been operated; means electrostatically connecting the control element of the extra tube to the input circuit of the beginning tube; a relay electron tube for each group actuated by the electric potential impulses on the output conductor of the associated group of tubes; means connecting the output of each relay tube to a common terminal so that said terminal receives an electric impulse for each tube of any group that is rendered conducting; a gaseous discharge electron tube provided for each group for delay purposes, each of said delay tubes having at least an anode, a cathode, and a control element and being supplied with anode-cathode potential from the same sources as the associated extra tube, and having a normally controlling bias potential applied to its control element; means connecting the control element of the delay tube to the cathode of the last selected tube of associated group whereby said delay tube is caused to conduct at the conclusion of the sequential operation of the tubes of the associated group; however, if the selectively operable means has not been operated, the said extra tube is caused to conduct on the receipt of an electric potential impulse on the input circuit of the beginning tube; means connecting the cathodes of the extra tubes and delay tubes to a common output terminal; a plurality of gaseous discharge electron tubes, there being one for starting the operation of each group; means connecting the starting tubes to anode-cathode supply sources so that, when any starting tube becomes conducting, it has a rise in cathode potential; and means connecting the cathode of each starting tube to the input circuit for the beginning tube of its associated group.

38. In combination, a plurality of groups of gaseous discharge electron tubes each having at least an anode, a cathode, and a control element; common means for the tubes of each group for supplying anode-cathode potential thereto including a common anode resistor and individual cathode resistors; means connecting the cathodes of the tubes of a group electrostatically to an output conductor connected over an impedance to a source of potential, said anode-cathode potential supply circuits having elements of resistance and capacitance which cause any conducting tube to be immediately extinguished when another tube of the group is rendered conducting; means connecting the control elements of the tubes of a group to a source of controlling potential; means connecting the tubes in a group in an operative sequence chain cathode to control grid; means electrostatically coupling the control element of the beginning tube of a group to an input circuit; means electrostatically connecting all the tubes in a group except the beginning tube to a common input conductor; selectively operable means to interrupt the inter-tube connections between any two tubes of a group, said selectively operable means, when operated also connecting the control element of the beginning tube to a source of bias-relieving potential so that the beginning tube will become conducting on receiving an input impulse on its input circuit; an extra gaseous discharge electron tube for each group, each extra tube having at least an anode, a cathode, and a control element; means to supply anode-cathode potential to each of said extra tubes, said means including a cathode resistor; means to supply bias potential to the control element of each of said extra tubes, which potential is controlling but is relieved from the bias-relieving potential source through the associated selectively operable means when said selectively operable means has not been operated; means electrostatically connecting the control element of the extra tube to the input circuit of the beginning tube; a relay electron tube for each group actuated by the electric potential impulses on the output conductor of the associated group of tubes; means connecting the output of each relay tube to a common terminal so that said terminal receives an electric impulse for each tube of any group that is rendered conducting; a gaseous discharge electron tube provided for each group for delay purposes, each of said delay tubes having at least an anode, a cathode, and a control element and being supplied with anode-cathode potential from the same sources as the associated extra tube, and having a normally controlling bias potential applied to its control element; means connecting the control element of the delay tube to the cathode of the last selected tube of the associated group, whereby said delay tube is caused to conduct at the conclusion of the sequential operation of the tubes of the associated group if the selectively operable means has been operated; however, if the selectively operable means has not been operated, the extra tube is caused to conduct on the receipt of an electric potential impulse on the input circuit of the beginning tube; means connecting the cathodes of the extra tubes and delay tubes to a common output terminal; a plurality of gaseous discharge electron tubes, there being one for starting the operation of each group; means connecting the starting tubes to anode-cathode supply sources so that, when any starting tube becomes conducting, it has a rise in cathode potential; means connecting the cathode of each starting tube to the input circuit for the beginning tube of its associated group; and means to cause the starting tubes to become conducting one at a time in sequence.

39. In combination, a plurality of groups of gaseous discharge electron tubes each having at least an anode, a cathode and a control element; common means for the tubes of each group for supplying anode-cathode potential thereto including a common anode resistor and individual cathode resistors; means connecting the cathodes of the tubes of a group electrostatically to an output conductor connected over a resistor to a source of potential, said anode-cathode potential supply circuits having elements of resistance and capacitance which cause any conducting tube to be immediately extinguished when another tube of the group is rendered conducting; means connecting the control elements of the tubes of a group to a source of controlling potential; means connecting the tubes in a group in an operative sequence chain cathode to control grid; means electrostatically coupling the control element of the beginning tube of a group to an input circuit; means electrostatically connecting all the tubes in a group except the beginning tube to a common input conductor; selectively operable means to interrupt the inter-tube connections between any two tubes of a group, said selectively operable means, when operated also connecting the control element of the beginning tube to a source of bias-relieving potential so that the beginning tube will become conducting on receiving an input impulse on its input circuit; an extra gaseous discharge electron tube for each group, each extra tube having at least an anode, a cathode, and a control element; means to supply anode-cathode potential to each of said extra tubes, said means including a cathode resistor; means to supply bias potential to the control element of each of said extra tubes, which potential is controlling but is relieved from the bias-relieving potential source through the associated selectively operable means when said selectively operable means has not been operated; means electrostatically connecting the control element of the extra tube to the input circuit of the beginning tube; a relay electron tube for each group actuated by the electric potential impulses on the output conductor of the associated groups of tubes; means connecting the output of each relay tube to a common terminal so that said terminal receives an electric impulse for each tube of any group that is rendered conducting; a gaseous discharge electron tube provided for each group for delay purposes, each of said delay tubes having at least an anode, a cathode, and a control element and being supplied with anode-cathode potential from the same sources as the associated extra tube, and having a normally controlling bias potential applied to its control element; means connecting the control element of the delay tube to the cathode of the last selected tube of the associated group, whereby said delay tube is caused to conduct at the conclusion of the sequential operation of the tubes of the associated group if the selectively operable means has been operated, but, if the selectively operable means has not been operated, then the extra tube alone will be caused to conduct on the receipt of an electric potential impulse on the input circuit of the beginning tube; means connecting the cathodes of the extra tubes and delay tubes to a common output terminal; a plurality of gaseous discharge electron tubes, there being one for starting the operation of each group; means connecting the starting tubes to anode-cathode supply sources so that, when any starting tube becomes conducting, it has a rise in cathode potential; means connecting the cathode of each starting tube to the input circuit for the beginning tube of its associated group; and means to cause the starting tubes to become conducting one at a time in a fixed sequence, each step being initiated by an impulse from the common output terminal of the delay tubes and extra tubes.

40. In combination, a plurality of groups of gaseous discharge electron tubes each having at least an anode, a cathode, and a control element; common means for the tubes of each group for supplying anode-cathode potential thereto including a common anode resistor and individual cathode resistors; means connecting the cathodes of the tubes of a group electrostatically to an output conductor connected over a resistor to a source of potential, said anode-cathode potential supply circuits having elements of resistance and capacitance which cause any conducting tube to be immediately extinguished when another tube of the group is rendered conducting; means connecting the control elements of the tubes of a group to a source of controlling potential; means connecting the tubes in a group in an operative sequence chain cathode to control grid; means electrostatically coupling the control element of the beginning tube of a group to an input circuit; means electrostatically connecting all the tubes in a group except the beginning tube to a common input conductor; selectively operable means to interrupt the inter-tube connections between any two tubes of a group, said selectively operable means, when operated also connecting the control element of the beginning tube to a source of bias-relieving potential so that the beginning tube will become conducting on receiving an input impulse on its input circuit; an extra gaseous discharge electron tube for each group, each extra tube having at least an anode, a cathode, and a control element; means to supply anode-cathode potential to each of said extra tubes, said means including a cathode resistor; means to supply bias potential to the control element of each of said extra tubes, which potential is controlling but is relieved from the bias-relieving potential source through the associated selectively operable means when said selectively operable means has not been operated; means electrostatically connecting the control element of the extra tube to the input circuit of the beginning tube; a relay electron tube for each group actuated by the electric potential impulses on the output conductor of the associated groups of tubes; means connecting the output of each relay tube to a common terminal so that said terminal receives an electric impulse for each tube of any group that is rendered conducting; a gaseous discharge electron tube provided for each group for delay purposes, each of said delay tubes having at least an anode, a cathode, and a control element and being supplied with anode-cathode potential from the same sources as the associated extra tube, and having a normally controlling bias potential applied to its control element; means connecting the control element of the delay tube to the cathode of the last selected tube of the associated group, whereby said delay tube is caused to conduct either at the conclusion of the sequential operation of the tubes of the associated group if the selectively operable means has been operated, but, if the selectively operable means has not been operated, the extra tube alone will be caused to conduct on the receipt of an electric potential impulse on the input circuit of the beginning tube; means connecting the cathodes of the extra tubes and delay tubes to a common output terminal; a plurality of gaseous discharge electron tubes, there being one for starting the operation of each group; means connecting the starting tubes to anode-cathode supply sources so that, when any starting tube becomes conducting, it has a rise in cathode potential; means connecting the cathode of each starting tube to the input circuit for the beginning tube of its associated group; and means to select certain of the starting tubes for operation.

41. In combination, a plurality of groups of gaseous discharge electron tubes each having at least an anode, a cathode, and a control element; common means for the tubes of each group for supplying anode-cathode potential thereto including a common anode resistor and individual cathode resistors; means connecting the cathodes of the tubes of a group electrostatically to an output conductor connected over a resistor to a source of potential, said anode-cathode potential supply circuits having elements of resistance and capacitance which causes any conducting tube to be immediately extinguished when another tube of the group is rendered conducting; means connecting the control elements of the tubes of a group to a source of controlling potential; means connecting the tubes in a group in an operative sequence chain cathode to control grid; means electrostatically coupling the control element of the beginning tube of a group to an input circuit; means electrostatically connecting all the tubes in a group except the beginnng tube to a common input conductor; selectively operable means to interrupt the inter-tube connections between any two tubes of a group, said selectively operable means, when operated, also connecting the control element of the beginning tube to a source of bias-relieving potential so that the beginning tube will become conducting on receiving an input impulse on its input circuit; an extra gaseous discharge electron tube for each group, each extra tube having at least an anode, a cathode, and a control element; means to supply anode-cathode potential to each of said extra tubes, said means including a cathode resistor; means to supply bias potential to the control element of each of said extra tubes, which potential is controlling but is relieved from the bias-relieving potential source through the associated selectively operable means when said selectively operable means has not been operated; means electrostatically connecting the control element of the extra tube to the input circuit of the beginning tube; a relay electron tube for each group actuated by the electric potential impulses on the output conductor of the associated groups of tubes; means connecting the output of each relay tube to a common terminal so that said terminal receives an electric impulse for each tube of any group that is rendered conducting; a gaseous discharge electron tube provided for each group for delay purposes, each of said delay tubes having at least an anode, a cathode, and a control element and being supplied with anode-cathode potential from the same sources as the associated extra tube, and having a normally controlling bias potential applied to its control element; means connecting the control element of the delay tube to the cathode of the last selected tube of the associated group, whereby said delay tube is caused to conduct either at the conclusion of the sequential operation of the tubes of the associated group if the selectively operable means has been operated, but, if the selectively operable means has not been operated, the extra tube alone will be caused to conduct on the receipt of an electric potential impulse on the input circuit of the beginning tube; means connecting the cathodes of the extra tubes and delay tubes to a common output terminal; a plurality of gaseous discharge electron tubes, there being one for starting the operation of each group; means connecting the starting tubes to anode-cathode supply sources so that, when any starting tube becomes conducting, it has a rise in cathode potential; means connecting the cathode of each starting tube to the input circuit for the beginning tube of its associated group; and means operated by the group selecting means for determining which of the starting tubes shall be operative.

42. In combination, a plurality of output groups of gaseous discharge electron tubes each having at least an anode, a cathode, and a control element; common means for the tubes of each group for supplying anode-cathode potential thereto including a common anode resistor and individual cathode resistors; means connecting the cathodes of the tubes of a group electrostatically to an output conductor connected over a resistor to a source of potential, said anode-cathode potential supply circuits having elements of resistance, and capacitance which causes any conducting tube to be immediately extinguished when another tube of the group is rendered conducting; means connecting the control elements of the tubes of a group to a source of controlling potential; means connecting the tubes in a group in an operative sequence chain cathode to control grid; means electrostatically coupling the control element of the beginning tube of a group to an input circuit; means electrostatically connecting all the tubes in a group except the beginning tube to a common input conductor; selectively operable means to interrupt the inter-tube connections between any two tubes of a group, said selectively operable means, when operated, also connecting the control element of the beginning tube to a source of bias-relieving potential so that the beginning tube will become conducting on receiving an input impulse on its input circuit; an extra gaseous discharge electron tube for each group, each extra tube having at least an anode, a cathode, and a control element; means to supply anode-cathode potential to each of said extra tubes, said means including a cathode resistor; means to supply bias potential to the control element of each of said extra tubes, which potential is controlling but is relieved from the bias-relieving potential source through the associated selectively operable means when said selectively operable means has not been operated; means electrostatically connecting the control element of the extra tube to the input circuit of the beginning tube; a relay electron tube for each group actuated by the electric potential impulses on the output conductor of the associated groups of tubes; means connecting the output of each relay tube to a common terminal so that said terminal receives an electric impulse for each tube of any group that is rendered conducting; a gaseous discharge electron tube provided for each group for delay purposes, each of said delay tubes having at least an anode, a cathode, and a control element and being supplied with anode-cathode potential from the same sources as the associated extra tube, and having a normally controlling bias potential applied to its control grid; means connecting the control element of the delay tube to the cathode of the last selected tube of the associated group, whereby said delay tube is caused to conduct at the conclusion of the sequential operation of the tubes of the associated group; however, if the selectively operable means has not been operated, the extra tube alone is caused to conduct on the receipt of an electric potential impulse on the input circuit of the beginning tube; means connecting the cathodes of the extra tubes and delay tubes to a common output terminal; a plurality of gaseous discharge electron tubes, there being one for starting the operation of each group; means connecting the starting tubes to anode-cathode supply sources so that, when any starting tube becomes conducting, it has a rise in cathode potential; means connecting the cathode of each starting tube to the input circuit for the beginning tube of its associated group; means interconnecting the starting tubes to become conducting one at a time in sequence in response to electric signals impressed on the common output terminal of the extra tubes; and means operated by the group selecting means to control the starting tubes to start their consecutive operation with the tube of the starting tube sequence group which is associated with the first output group in which the selectively operable means has been operated.

43. In a calculating device, the combination of a data-entering recycling control including a number of denominationally arranged groups of electric impulse producing units each producing an impulse when operated; means to select for operation a number of units in each group; an end unit for each group operating automatically at the conclusion of operation of the selected units of the associated group to produce an electric impulse; means connecting the units in a bank for sequential operation of the selected ones one at a time in response to commonly received electric impulses; means to initiate the sequential operation of a group; means operable by each impulse produced by a unit of the group to cause operation of the next unit of the group in sequence or cause operation of the end unit at the conclusion of the group sequence; and means operated by the electric impulse produced by the end unit of a group for commencing the operation of the units in another group.

44. In combination, a plurality of electronic devices each having at least an anode, a cathode, and a control member; means coupling the tubes cathode to grid in an operative sequence chain; means coupling the cathodes of all but the end tube to a common output conductor; means coupling the control elements of the first and last tube of the sequence to a first input conductor, an electric impulse on which tends to render the associated tubes conducting; means coupling the control elements of the intermediate tubes of the group to a second input conductor, an electric impulse on which tends to render the associated tubes conducting; supply circuits for supplying anode-cathode potential and bias potential for the tubes including an individual resistor for each cathode, conduction in the first or intermediate tubes causing an electric impulse on the output conductor; and an electric impulse producer actuable in cycles in response to an electric impulse, for producing a selected number of impulses in a cycle, said producer being actuated by being connected to the aforementioned output conductor.

45. In combination, a plurality of electronic devices each having at least an anode, a cathode, and a control member; means coupling the tubes cathode to grid in an operative sequence chain; means coupling the cathodes of all but the end tube to a common output conductor; means coupling the control elements of the first and last tube of the sequence to a first input conductor; an electric impulse on which tends to render the associated tubes conducting; means coupling the control elements of the intermediate tubes of the group to a second input conductor, an electric impulse on which tends to render the associated tubes conducting; supply circuits for supplying the anode-cathode potential and bias potential for the tubes including an individual resistor for each cathode, conduction in the first or intermediate tubes causing an electric impulse on the output conductor; an electric impulse producer, actuable in cycles each initiated by an electric impulse, for producing a selected number of electric impulses and an end electric impulse in a cycle; means connecting the output conductor to the impulse producer, the output impulses actuating the impulse producer; and means conveying the end electric impulse of the producer to the second input conductor to actuate the intermediate tubes.

46. In a multiplying device, a multiplicand unit including a plurality of unit-representing electron tubes; means connecting the multiplicand tubes into denominational groups for automatic sequential operation, said connecting means including means for selecting the number of tubes that are to operate in each group according to multiplicand data; a common output conductor for each group of multiplicand tubes coupled to the tubes therein to have an electric impulse impressed thereon each time a selected tube in the group operates; means connecting the groups for operation in sequence in a cycle so that the last tube to operate in a group will initiate the automatic sequential operation of the tubes of the next group of the sequence; an end-of-cycle means controlled by the last group in the sequence and operable when the tubes in that group have operated; a multiplier unit including a plurality of unit-representing electron tubes; means connecting the multiplier tubes in denominational groups for sequential operation in response to impulses, and including selecting means for selecting the number of tubes to operate in each group according to multiplier data; a common conductor for each group of multiplier tubes coupled to the tubes of the related groups to have an electric impulse impressed thereon each time a selected tube in the group operates; means connecting the groups of multiplier tubes for operation in sequence, the last tube to operate in one group causing the first tube which will be operated in the next group in sequence, to be prepared for operation; means connecting the end-of-cycle means of the multiplicand unit to the multiplier unit to cause an operation of a prepared tube in the multiplier unit each time the end-of-cycle means operates; and means connected to the output conductors of the multiplier unit and to the first tube in the first denominational group of the multiplicand unit to operate, to initiate an automatic operation of the tubes in the various groups of the multiplicand unit each time a tube in the multiplier unit operates.

47. In combination, a plurality of denominational groups of digit-representing electron tubes; selectively operable circuits connecting the tubes of each group so that any selected number of tubes in the group will operate automatically in sequence upon an initiation of an operation of the tubes of a group; means interconnecting the groups of tubes for automatic sequential operation including connections from the last tube to operate in a group to the first tube to operate in the next group whereby the operation of the last tube in one group will initiate the automatic sequential operation of the tubes in the next group in the sequence; means controlled by the last group of the sequence and operated upon the operation of the last tube to operate therein, for generating a control signal; and means operable by the control signal to cause the initiation of operation of the tubes in the first group, said last mentioned means including settable means to cause the initiation to take place a selected number of times automatically in succession.

48. In combination, a plurality of denominational groups of digit-representing gaseous electron tubes; selectively operable circuits connecting the tubes of each group so that, upon initiation of an operation, a selected number of the tubes in each group will be rendered conducting in sequence; means connecting the groups for operation one after another in sequence including a connection between the last tube to operate in a group and the first tube to operate in the next group in the sequence, enabling conduction in the last tube to operate in one group to initiate the automatic sequential operation of the selected tubes of the next group; means operable in response to the operation of the last tube in the last group of the sequence for generating a control signal; and means operable by the control signal to cause the initiation of operation of the selected tubes in the first group of the sequence, said last mentioned means including selectively operable instrumentalities for limiting the number of times the initiation will occur automatically in succession.

ROBERT E. MUMMA.

REFERENCES CITED

The following references are of record in the file of this patent:

UNITED STATES PATENTS

| Number | Name | Date |
| --- | --- | --- |
| 2,176,932 | Smith | Oct. 24, 1939 |
| 2,373,134 | Massonneau | Apr. 10, 1945 |
| 2,403,852 | Desch | July 9, 1946 |

Certificate of Correction

Patent No. 2,503,127 April 4, 1950

ROBERT E. MUMMA

It is hereby certified that errors appear in the printed specification of the above numbered patent requiring correction as follows:

Column 3, line 66, for "firinng" read *firing*; column 6, line 13, for "commence" read *commences*; column 14, line 17, after the numeral "13" insert a closing parenthesis; column 26, line 32, for "caused" read *causes*; column 39, line 73, after the syllable "erated" insert a comma; column 41, line 2, and column 42, line 9, after the word "operated" insert a comma;

and that the said Letters Patent should be read with these corrections therein that the same may conform to the record of the case in the Patent Office.

Signed and sealed this 11th day of July, A. D. 1950.

[SEAL]

THOMAS F. MURPHY,
*Assistant Commissioner of Patents.*